US009817650B2

(12) United States Patent
Ronning et al.

(10) Patent No.: US 9,817,650 B2
(45) Date of Patent: Nov. 14, 2017

(54) SCHEDULING OF A FILE DOWNLOAD AND SEARCH FOR UPDATES

(75) Inventors: Joel A. Ronning, Minneapolis, MN (US); Kelly J. Wical, Hastings, MN (US); Marc A. Kukura, Minneapolis, MN (US)

(73) Assignee: Digital River, Inc., Minnetonka, MN (US)

( * ) Notice: Subject to any disclaimer, the term of this patent is extended or adjusted under 35 U.S.C. 154(b) by 778 days.

(21) Appl. No.: 13/458,367

(22) Filed: Apr. 27, 2012

(65) Prior Publication Data

US 2012/0216182 A1    Aug. 23, 2012

Related U.S. Application Data

(60) Continuation of application No. 10/403,596, filed on Mar. 31, 2003, which is a division of application No. 09/492,846, filed on Jan. 27, 2000, now abandoned, which is a continuation-in-part of application No.
(Continued)

(51) Int. Cl.
| G06F 9/445 | (2006.01) |
| G06F 15/16 | (2006.01) |
| H04L 29/08 | (2006.01) |

(52) U.S. Cl.
CPC .............. G06F 8/65 (2013.01); H04L 67/06 (2013.01); H04L 69/329 (2013.01)

(58) Field of Classification Search
CPC .............. H04L 29/08072; H04L 29/06; H04L 29/0809; H04L 29/06047; G06Q 30/02
See application file for complete search history.

(56) References Cited

U.S. PATENT DOCUMENTS

| 3,798,605 A | 3/1974 | Feistel |
| 3,990,710 A | 11/1976 | Hughes |
| 4,200,770 A | 4/1980 | Hellman et al. |
(Continued)

FOREIGN PATENT DOCUMENTS

| JP | 57127249 | 11/1982 |
| JP | 60077218 | 9/1985 |
(Continued)

OTHER PUBLICATIONS

Dolinar, Lou,"FTP Programs Help You Navigate the Net", Buffalo News; Buffalo, N.Y.; Jul. 7, 1998, pp. 2, extracted from Internet, http://proquest.umi.com on Nov. 8, 2002.
(Continued)

*Primary Examiner* — Abdullahi E Salad
(74) *Attorney, Agent, or Firm* — Shawn Dempster; Lynn Holly; Billion & Armitage

(57) ABSTRACT

An agent software application for controlling distribution of files and managing updates to files. The agent automatically downloads files upon request by a user and can download a file in multiple portions by tracking received byte numbers. The agent searches for updates to files by using application signatures to uniquely identify files stored on a user's machine and transmitting the application signatures to a server storing the updates. The user can set parameters related to control of the downloading and searching for file updates, including scheduling of downloads for selected files and scheduling of automatic searching for updates on a periodic basis.

9 Claims, 24 Drawing Sheets

Related U.S. Application Data

09/372,253, filed on Aug. 11, 1999, now Pat. No. 7,058,597.

(60) Provisional application No. 60/110,952, filed on Dec. 4, 1998.

(56) References Cited

U.S. PATENT DOCUMENTS

| | | | |
|---|---|---|---|
| 4,218,582 | A | 8/1980 | Hellman et al. |
| 4,264,782 | A | 4/1981 | Konheim |
| 4,405,829 | A | 9/1983 | Rivest et al. |
| 4,424,414 | A | 1/1984 | Hellman et al. |
| 4,446,519 | A | 5/1984 | Thomas |
| 4,458,315 | A | 7/1984 | Uchenick |
| 4,465,901 | A | 8/1984 | Best |
| 4,490,810 | A | 12/1984 | Hon |
| 4,528,643 | A | 7/1985 | Freeny, Jr. |
| 4,558,302 | A | 12/1985 | Welch |
| 4,558,413 | A | 12/1985 | Schmidt et al. |
| 4,567,512 | A | 1/1986 | Abraham |
| 4,590,557 | A | 5/1986 | Lillie |
| 4,649,510 | A | 3/1987 | Schmidt |
| 4,654,799 | A | 3/1987 | Ogaki et al. |
| 4,658,093 | A | 4/1987 | Hellman |
| 4,672,554 | A | 6/1987 | Ogaki |
| 4,674,055 | A | 6/1987 | Ogaki et al. |
| 4,685,055 | A | 8/1987 | Thomas |
| 4,740,890 | A | 4/1988 | William |
| 4,780,905 | A | 10/1988 | Cruts et al. |
| 4,787,050 | A | 11/1988 | Suzuki |
| 4,791,565 | A | 12/1988 | Dunham et al. |
| 4,796,220 | A | 1/1989 | Wolfe |
| 4,815,030 | A | 3/1989 | Cross et al. |
| 4,827,508 | A | 5/1989 | Shear |
| 4,864,516 | A | 9/1989 | Gaither et al. |
| 4,888,798 | A | 12/1989 | Earnest |
| 4,890,258 | A | 12/1989 | Tsugei et al. |
| 4,893,248 | A | 1/1990 | Pitts et al. |
| 4,918,602 | A | 4/1990 | Bone et al. |
| 4,949,257 | A | 8/1990 | Orbach |
| 4,974,160 | A | 11/1990 | Bone et al. |
| 4,999,806 | A | 3/1991 | Chernow et al. |
| 5,006,849 | A | 4/1991 | Baarman et al. |
| 5,010,571 | A | 4/1991 | Katznelson |
| 5,014,234 | A | 5/1991 | Edwards, Jr. |
| 5,016,009 | A | 5/1991 | Whiting et al. |
| 5,027,291 | A | 6/1991 | Callahan et al. |
| 5,047,928 | A | 9/1991 | Wiedemer |
| 5,051,745 | A | 9/1991 | Katz |
| 5,103,392 | A | 4/1992 | Mori |
| 5,103,476 | A | 4/1992 | Waite et al. |
| 5,109,413 | A | 4/1992 | Comerford et al. |
| 5,166,886 | A | 11/1992 | Molnar et al. |
| 5,199,066 | A | 3/1993 | Logan |
| 5,222,134 | A | 6/1993 | Waite et al. |
| 5,237,157 | A | 8/1993 | Kaplan |
| 5,241,671 | A | 8/1993 | Reed et al. |
| 5,267,171 | A | 11/1993 | Suzuki et al. |
| 5,269,698 | A | 12/1993 | Singer |
| 5,293,422 | A | 3/1994 | Loiacono |
| 5,327,563 | A | 7/1994 | Singh |
| 5,341,429 | A | 8/1994 | Stringer et al. |
| 5,355,302 | A | 10/1994 | Martin et al. |
| 5,357,563 | A | 10/1994 | Hamilton et al. |
| 5,367,563 | A | 11/1994 | Sainton |
| 5,367,667 | A | 11/1994 | Wahlquist et al. |
| 5,367,704 | A | 11/1994 | Hasuo et al. |
| 5,375,240 | A | 12/1994 | Grundy |
| 5,381,539 | A | 1/1995 | Yanai et al. |
| 5,386,104 | A | 1/1995 | Sime |
| 5,386,369 | A | 1/1995 | Christiano |
| 5,388,211 | A | 2/1995 | Hornbuckle |
| 5,388,993 | A | 2/1995 | McKiel et al. |
| 5,390,297 | A | 2/1995 | Barber et al. |
| 5,404,505 | A | 4/1995 | Levinson |
| 5,404,510 | A | | 4/1995 | Smith et al. |
| 5,426,421 | A | | 6/1995 | Gray |
| 5,426,747 | A | | 6/1995 | Weinreb et al. |
| 5,430,841 | A | | 7/1995 | Tannenbaum et al. |
| 5,487,143 | A | | 1/1996 | Southgate |
| 5,495,411 | A | | 2/1996 | Ananda |
| 5,509,070 | A | | 4/1996 | Schull |
| 5,515,538 | A | | 5/1996 | Kleiman |
| 5,526,485 | A | | 6/1996 | Brodsky |
| 5,530,865 | A | | 6/1996 | Owens et al. |
| 5,535,188 | A | | 7/1996 | Dang et al. |
| 5,537,568 | A | | 7/1996 | Yanai et al. |
| 5,539,908 | A | | 7/1996 | Chen et al. |
| 5,557,518 | A | | 9/1996 | Rosen |
| 5,563,946 | A | | 10/1996 | Cooper et al. |
| 5,564,038 | A | | 10/1996 | Grantz et al. |
| 5,570,373 | A | * | 10/1996 | Wing .......................... 455/423 |
| 5,579,479 | A | | 11/1996 | Plum |
| 5,581,764 | A | | 12/1996 | Fitzgerald et al. |
| 5,598,470 | A | | 1/1997 | Cooper et al. |
| 5,600,781 | A | | 2/1997 | Root et al. |
| 5,621,201 | A | | 4/1997 | Langhans et al. |
| 5,625,690 | A | | 4/1997 | Michel et al. |
| 5,627,886 | A | | 5/1997 | Bowman |
| 5,628,015 | A | | 5/1997 | Singh |
| 5,629,980 | A | | 5/1997 | Stefik et al. |
| 5,634,012 | A | | 5/1997 | Stefik et al. |
| 5,649,186 | A | | 7/1997 | Ferguson |
| 5,649,187 | A | | 7/1997 | Hornbuckle |
| 5,652,786 | A | | 7/1997 | Rogers |
| 5,654,905 | A | | 8/1997 | Mulholland et al. |
| 5,657,390 | A | | 8/1997 | Elgamal et al. |
| 5,666,411 | A | | 9/1997 | McCarty |
| 5,666,501 | A | | 9/1997 | Jones et al. |
| 5,671,279 | A | | 9/1997 | Elgamal |
| 5,671,281 | A | | 9/1997 | Campbell et al. |
| 5,671,412 | A | | 9/1997 | Christiano |
| 5,671,420 | A | | 9/1997 | Bell et al. |
| 5,673,315 | A | | 9/1997 | Wolf |
| 5,675,645 | A | | 10/1997 | Schwartz et al. |
| 5,684,996 | A | | 11/1997 | Westerholm et al. |
| 5,689,560 | A | | 11/1997 | Cooper et al. |
| 5,696,975 | A | | 12/1997 | Moore et al. |
| 5,706,435 | A | | 1/1998 | Barbara et al. |
| 5,710,884 | A | | 1/1998 | Dedrick |
| 5,710,887 | A | | 1/1998 | Chelliah et al. |
| 5,715,403 | A | | 2/1998 | Stefik |
| 5,727,205 | A | | 3/1998 | Bell et al. |
| 5,727,215 | A | | 3/1998 | Rynaski et al. |
| 5,737,416 | A | | 4/1998 | Cooper et al. |
| 5,740,549 | A | | 4/1998 | Reilly et al. |
| 5,742,757 | A | | 4/1998 | Hamadani et al. |
| 5,745,574 | A | | 4/1998 | Muftic |
| 5,745,754 | A | | 4/1998 | Lagarde et al. |
| 5,745,879 | A | | 4/1998 | Wyman |
| 5,754,646 | A | | 5/1998 | Williams et al. |
| 5,754,754 | A | | 5/1998 | Dudley et al. |
| 5,757,907 | A | | 5/1998 | Cooper et al. |
| 5,757,908 | A | | 5/1998 | Cooper et al. |
| 5,758,068 | A | | 5/1998 | Brandt et al. |
| 5,761,308 | A | | 6/1998 | Torii et al. |
| 5,761,651 | A | | 6/1998 | Hasebe et al. |
| 5,768,527 | A | | 6/1998 | Zhu et al. |
| 5,768,528 | A | | 6/1998 | Stumm |
| 5,768,597 | A | | 6/1998 | Simm |
| 5,771,347 | A | | 6/1998 | Grantz et al. |
| 5,774,879 | A | | 6/1998 | Custy et al. |
| 5,778,234 | A | | 7/1998 | Hecht et al. |
| 5,781,785 | A | | 7/1998 | Rowe et al. |
| 5,784,461 | A | | 7/1998 | Shaffer et al. |
| 5,794,052 | A | | 8/1998 | Harding |
| 5,796,825 | A | | 8/1998 | McDonnal et al. |
| 5,805,699 | A | | 9/1998 | Akiyama et al. |
| 5,805,898 | A | | 9/1998 | Barsness et al. |
| 5,819,226 | A | | 10/1998 | Gopinathan et al. |
| 5,826,245 | A | | 10/1998 | Sandberg-Diment |
| 5,832,208 | A | | 11/1998 | Chen et al. |
| 5,835,721 | A | | 11/1998 | Donahue et al. |
| 5,836,911 | A | | 11/1998 | Marzynski et al. |

(56) References Cited

U.S. PATENT DOCUMENTS

| | | | |
|---|---|---|---|
| 5,842,024 A | 11/1998 | Choye et al. | |
| 5,845,074 A | 12/1998 | Kobata | |
| 5,848,154 A | 12/1998 | Nishio et al. | |
| 5,859,969 A | 1/1999 | Oki et al. | |
| 5,860,012 A | 1/1999 | Luu | |
| 5,860,074 A | 1/1999 | Rowe et al. | |
| 5,864,620 A | 1/1999 | Pettitt | |
| 5,870,543 A | 2/1999 | Ronning | |
| 5,875,247 A | 2/1999 | Nakashima et al. | |
| 5,880,446 A | 3/1999 | Mori et al. | |
| 5,883,810 A | 3/1999 | Franklin et al. | |
| 5,883,954 A | 3/1999 | Ronning | |
| 5,883,955 A | 3/1999 | Ronning | |
| 5,887,060 A | 3/1999 | Ronning | |
| 5,887,192 A | 3/1999 | Nishio | |
| 5,889,860 A | 3/1999 | Eller et al. | |
| 5,890,137 A | 3/1999 | Koreeda | |
| 5,897,622 A | 4/1999 | Blinn et al. | |
| 5,903,566 A | 5/1999 | Flammer, II | |
| 5,903,647 A | 5/1999 | Ronning | |
| 5,903,881 A | 5/1999 | Schrader et al. | |
| 5,903,896 A | 5/1999 | Waldman et al. | |
| 5,907,617 A | 5/1999 | Ronning | |
| 5,912,902 A | 6/1999 | Monroe | |
| 5,913,040 A | 6/1999 | Rakavy et al. | |
| 5,915,019 A | 6/1999 | Ginter et al. | |
| 5,915,023 A | 6/1999 | Bernstein | |
| 5,918,217 A | 6/1999 | Maggioncalda et al. | |
| 5,919,247 A | 7/1999 | Van Hoff et al. | |
| 5,920,725 A | 7/1999 | Ma et al. | |
| 5,940,834 A | 8/1999 | Pinard et al. | |
| 5,956,483 A | 9/1999 | Grate et al. | |
| 5,974,443 A | 10/1999 | Jeske | |
| 5,982,891 A | 11/1999 | Ginter et al. | |
| 5,983,227 A | 11/1999 | Nazem et al. | |
| 5,987,454 A | 11/1999 | Hobbs | |
| 5,987,480 A | 11/1999 | Donohue et al. | |
| 5,999,912 A | 12/1999 | Wodarz et al. | |
| 6,004,276 A | 12/1999 | Wright et al. | |
| 6,012,087 A | 1/2000 | Freivald et al. | |
| 6,021,276 A | 2/2000 | Demke et al. | |
| 6,023,509 A | 2/2000 | Herbert et al. | |
| 6,023,698 A | 2/2000 | Lavey et al. | |
| 6,026,369 A | 2/2000 | Capek | |
| 6,026,413 A | 2/2000 | Challenger et al. | |
| 6,029,141 A | 2/2000 | Bezos et al. | |
| 6,029,144 A | 2/2000 | Barrett et al. | |
| 6,029,154 A | 2/2000 | Pettitt | |
| 6,034,652 A * | 3/2000 | Freiberger et al. | 715/730 |
| 6,044,471 A | 3/2000 | Colvin | |
| 6,049,892 A | 4/2000 | Casagrande et al. | |
| 6,073,124 A | 6/2000 | Krishnan et al. | |
| 6,074,299 A | 6/2000 | Cohen | |
| 6,085,171 A | 7/2000 | Leonard | |
| 6,097,390 A | 8/2000 | Marks | |
| 6,100,887 A | 8/2000 | Bormann et al. | |
| 6,106,570 A * | 8/2000 | Mizuhara | 717/169 |
| 6,108,642 A | 8/2000 | Findley | |
| 6,128,655 A | 10/2000 | Fields et al. | |
| 6,134,584 A * | 10/2000 | Chang et al. | 709/219 |
| 6,141,006 A | 10/2000 | Knowlton et al. | |
| 6,151,708 A | 11/2000 | Pedrizetti et al. | |
| 6,154,729 A | 11/2000 | Cannon et al. | |
| 6,157,917 A | 12/2000 | Barber | |
| 6,167,567 A * | 12/2000 | Chiles et al. | 717/173 |
| 6,185,608 B1 | 2/2001 | Hon et al. | |
| 6,199,107 B1 | 3/2001 | Dujari | |
| 6,223,166 B1 | 4/2001 | Kay | |
| 6,226,618 B1 | 5/2001 | Downs et al. | |
| 6,230,145 B1 | 5/2001 | Verderamo et al. | |
| 6,233,565 B1 | 5/2001 | Lewis et al. | |
| 6,240,396 B1 | 5/2001 | Walker et al. | |
| 6,247,130 B1 | 6/2001 | Fritsch | |
| 6,253,186 B1 | 6/2001 | Pendleton et al. | |
| 6,263,353 B1 | 7/2001 | Gross et al. | |
| 6,263,446 B1 | 7/2001 | Kausik et al. | |
| 6,278,449 B1 | 8/2001 | Sugiarto et al. | |
| 6,289,452 B1 | 9/2001 | Arnold et al. | |
| 6,292,835 B1 | 9/2001 | Huang et al. | |
| 6,314,408 B1 | 11/2001 | Salas et al. | |
| 6,317,723 B1 | 11/2001 | Walker et al. | |
| 6,327,617 B1 * | 12/2001 | Fawcett | 709/219 |
| 6,330,546 B1 | 12/2001 | Gopinathan et al. | |
| 6,336,098 B1 | 1/2002 | Fortenberry et al. | |
| 6,353,926 B1 | 3/2002 | Parthesarathy et al. | |
| 6,385,596 B1 | 5/2002 | Wiser et al. | |
| 6,389,541 B1 | 5/2002 | Patterson | |
| 6,396,805 B2 | 5/2002 | Romrell | |
| 6,405,175 B1 | 6/2002 | Ng | |
| 6,463,418 B1 | 10/2002 | Todd | |
| 6,473,740 B2 | 10/2002 | Cockrill et al. | |
| 6,516,346 B1 | 2/2003 | Asco et al. | |
| 6,522,342 B1 | 2/2003 | Gagnon et al. | |
| 6,529,885 B1 | 3/2003 | Johnson | |
| 6,542,897 B2 | 4/2003 | Lee | |
| 6,574,729 B1 | 6/2003 | Fink et al. | |
| 6,594,682 B2 | 7/2003 | Peterson et al. | |
| 6,597,891 B2 | 7/2003 | Tantawy et al. | |
| 6,639,687 B1 | 10/2003 | Neilsen | |
| 6,650,998 B1 | 11/2003 | Rutledge et al. | |
| 6,651,108 B2 | 11/2003 | Popp | |
| 6,697,948 B1 | 2/2004 | Rabin et al. | |
| 6,745,224 B1 | 6/2004 | D'Souza et al. | |
| 6,799,165 B1 | 9/2004 | Boesjes | |
| 6,807,632 B1 | 10/2004 | Carpentier et al. | |
| 6,845,453 B2 | 1/2005 | Scheidt et al. | |
| 6,963,923 B1 | 11/2005 | Bennett | |
| 7,165,051 B2 | 1/2007 | Ronning et al. | |
| 7,181,418 B1 | 2/2007 | Zucker et al. | |
| 2002/0133637 A1 | 9/2002 | Popp et al. | |
| 2003/0028481 A1 | 2/2003 | Flitcroft et al. | |
| 2005/0273779 A1 | 12/2005 | Cheng | |

FOREIGN PATENT DOCUMENTS

| | | |
|---|---|---|
| JP | 03083132 | 6/1991 |
| WO | WO99/49424 | 9/1999 |
| WO | WO99/52267 A1 | 10/1999 |
| WO | WO00/23909 | 4/2000 |
| WO | WO0023928 | 4/2000 |
| WO | WO0023929 | 4/2000 |

OTHER PUBLICATIONS

Woollacott et al., "Web Spoofing poses new security threat", InfoWorld; Framingham; Jan. 6, 1997 extracted from Internet, http://proquest.umi.com on Nov. 8, 2002.

"Computer Dictionary", Microsoft Press, Redmond, Washington, 1997, p. 119, heading "COOKIE".

"The Internet Complete Reference", Osborne McGraw Hill, California, 1996, p. 358, lines 20-26.

"Inktomi Powers Advanced Information Indexing: SmartCrawl Technology Offers Turnkey Solution to Rapidly Index Web Site Content," Inktomi Press Release, (Dec. 11, 1996), New York.

"Inktomi Unveils Smart Network Strategy to Alleviate Network Overload and Enhance Global Information Access: "Traffic Servers" Are Key to Reducing Redundant Net Traffic," Inktomi Press Release, (Apr. 14, 1997), Berkeley, CA.

"PointCast Unveils First News Network that Reaches Viewers at Their Desktops: Major Industry Players Embrace "Pointcasting" Combines the Timeliness of Broadcast With the Power of the Internet to Deliver Personalized News Instantly," PointCast Press Releases, (Feb. 13, 1996), San Francisco, CA.

"Lotus and PointCast to Collaborate on Interactive Information Delivery System for Corporate Intranets: Companies Will Link PointCast's SmartScreen and I-Server Technology With Lotus Domino Intranet Server and the World Wide Web," PointCast Press Releases, (Jul. 23, 1996), Cambridge, MA/Cupertino, CA.

"PointCast and Infoseek Collaborate to Offer Additional Personalized Content on the PointCast Network: Infoseek Search Technol-

(56) References Cited

OTHER PUBLICATIONS ogy Enhances PointCast Network Viewer Experience With Instant Search Capabilities," PointCast Press Releases, (Aug. 5, 1996), Cupertino, CA.

"Department of Defense Chooses software.net for Electronic Ordering and Fulfillment Over the Internet:: software.net Opens the Microsoft Government Express! Center for vol. Discount Pricing on Microsoft Products," software.net Press Release, (Apr. 3, 1996), Washington, DC.

"CyberSource Corp. Selected as Electronic Distributor for Over 2,100 Adobe Fonts: First Time Consumers Have Immediate Availability of the Latest Fonts From Adobe Type Library," software.net Press Release, (Jun. 18, 1996), Menlo Park, CA.

"CyberSource and Online Interactive Help Microsoft Meet Heavy Demand for Its Frontpage Software: Electronic Resellers Deliver on the Promise of Electronic Software Distribution," software.net Press Release, (Aug. 6, 1996), Menlo Park, CA/Seattle WA.

"Software.net and Microsoft Ink Largest Electronic Software Distribution Deal in Internet History: Defense Logistics and Department of Defense Procurement Agencies Receive Software Via the Internet, Enabling the U.S. Government to Avoid an Estimated $30 Million and Reducing Delivery Times to a Single Day," (Jul. 1, 1997), San Jose, CA.

Prosise, J., PC Magazine—Dos 5 Techniques and Utilities, Ziff-Davis Press, Emeryville, CA 94608: 82-85 (1991).

Prosise, J., "PC Magazine DOS 5—Techniques and Utilities," pp. 365-367, Ziff-Davis Press, PC Magazine, Emeryville, CA, 1991.

Amanda Mitchell, "Chicago Features Spark Online Distribution," Computer Reseller News, (Aug. 1994), p. 101.

"Testdrive Founder/CEO Resigns to Form New Info Highway Company," Business Wire, (Jun. 1994), Cupertino, CA.

Don Clark, "Multimedia: Patents May Raise Price of Information Highway," The Wall Street Journal, (Nov. 1993).

Walter S. Mossberg, "Personal Technology," The Wall Street Journal, (Dec. 1993), p. 12.

"Try and Buy on CD-Rom," Marketing Computers, (Oct. 1993), p. 12.

"Multimedia World," Advertising Age, (Aug. 1993), p. 23.

Office Action for U.S. Appl. No. 10/396,098, dated Feb. 16, 2010.

Hanagandi et al. ("Density Based Clustering and Radial Basis Function Modeling to Generate Credit card Fraud Scores", Feb. 1996, Computational Intelligence for Financial Engineering, Proceedings of the IEEE/IAFE Conference, Mar. 24-26, 1996, 5 pages).

\* cited by examiner

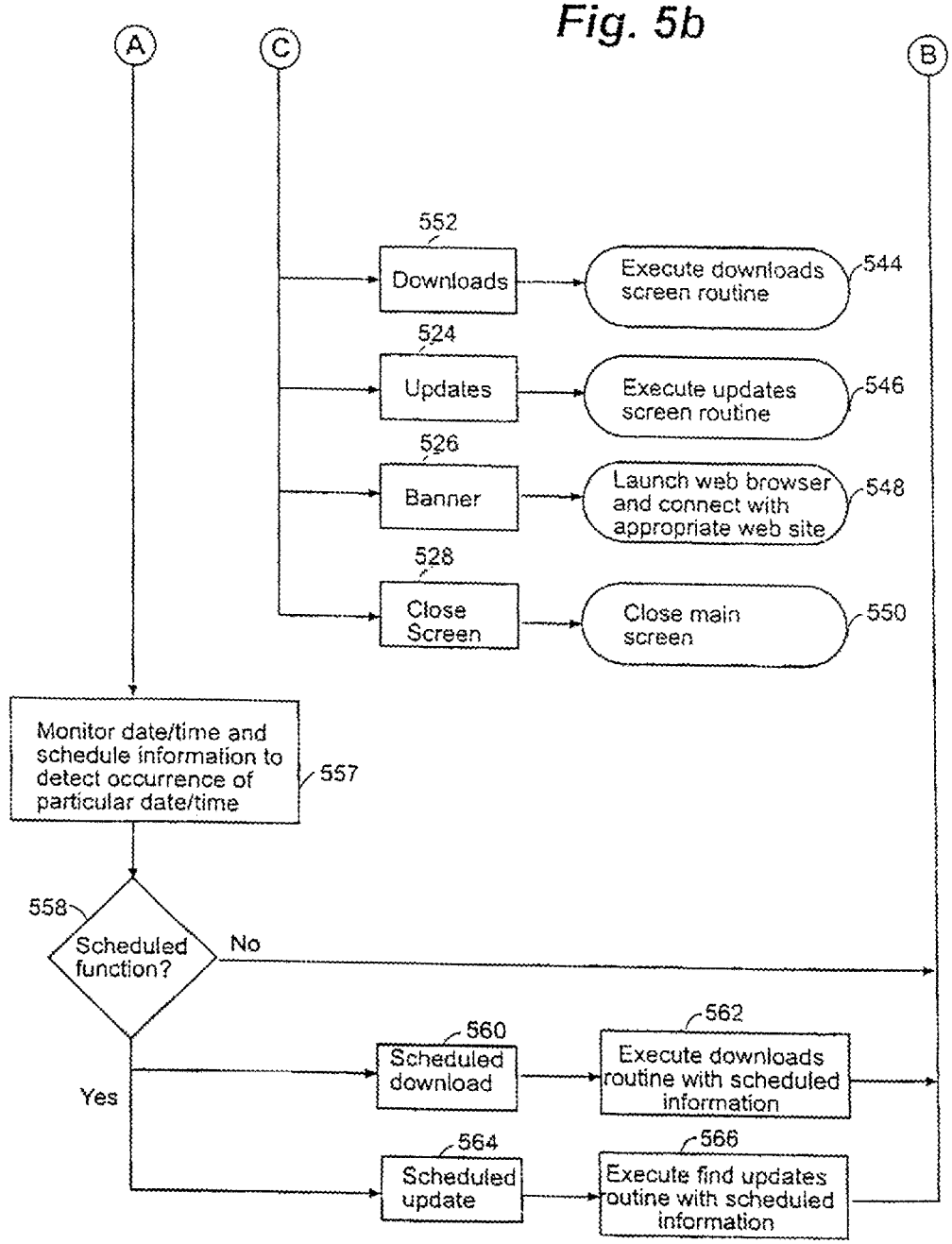

SCHEDULING OF A FILE DOWNLOAD AND SEARCH FOR UPDATES

REFERENCE TO RELATED APPLICATIONS

The present application is a continuation of U.S. patent application Ser. No. 10/403,596, filed Mar. 31, 2003, and entitled "Screen Displays for Showing the Status of a File Download", which is a divisional of U.S. application Ser. No. 09/492,846, filed Jan. 27, 2000, and entitled "Apparatus And Method For Controlling Distribution Of Files And File Updates", now abandoned, which is a continuation-in-part of U.S. application Ser. No. 09/372,253, filed Aug. 11, 1999, and entitled "Apparatus And Method For Adaptive Fraud Screening For Electronic Commerce Transactions", now issued as U.S. Pat. No. 7,058,597, which claims the benefit of U.S. Provisional Application No. 60/110,952, filed Dec. 4, 1998, and entitled "Apparatus and Method for Providing Electronic Commerce," all of which are incorporated herein by reference as if fully set forth.

The present application is related to the following applications, all of which are incorporated herein by reference as if fully set forth:

U.S. patent application Ser. No. 09/492,844, filed Jan. 27, 2000, entitled "Apparatus and Method for Secure Downloading of Files", now issued as U.S. Pat. No. 7,617,124;

U.S. patent application Ser. No. 09/492,845, filed Jan. 27, 2000, entitled "Global Web Site Management", now abandoned;

U.S. patent application Ser. No. 09/492,847, filed Jan. 27, 2000, entitled "Cache Management for Dynamic Web Pages", now abandoned;

U.S. patent application Ser. No. 10/396,098, filed Mar. 25, 2003, and entitled "Apparatus And Method For Scheduling Of Search For Updates Or Downloads Of A File", now abandoned;

U.S. patent application Ser. No. 10/403,359, filed Mar. 31, 2003, and entitled "Apparatus and Method for Using Application Signatures for the Identification of Files", now pending;

U.S. patent application Ser. No. 11/067,396, filed Feb. 22, 2005, and entitled "Electronic Commerce System and Method for Detecting Fraud", now issued as U.S. Pat. No. 7,165,051;

U.S. patent application Ser. No. 11/549,036, filed Oct. 12, 2006, and entitled "Electronic Commerce System and Method for Detecting Fraud", now pending;

U.S. patent application Ser. No. 11/549,042, filed Oct. 12, 2006, and entitled "Electronic Commerce System and Method for Detecting Fraud", now issued as U.S. Pat. No. 7,881,972; and U.S. patent application Ser. No. 12/569,148, filed Sep. 29, 2009, and entitled "Secure Downloading of a File From a Network System and Method", now issued as U.S. Pat. No. 8,050,980.

FIELD OF THE INVENTION

The present invention relates to an apparatus and method for controlling distribution of files and updates to files.

BACKGROUND OF THE INVENTION

Various systems exist for distribution of files over the Internet upon or other networks. With these systems, a user requests to download a particular software file, and the corresponding system transmits the file to the user's machine. The transmission may occur using conventional protocols for distribution of information over the Internet. If the transmission becomes interrupted due to, for example, loss of the network connection, the user must manually request to download the file again, and typically must attempt to download the entire file. Some particular systems exist for transmitting only a portion of a file. However, the systems are often specific to a particular network and require manual interaction by the user as well.

In addition, after downloading the software file, a user is not necessarily informed of any updates to the file. Software is frequently updated in order to provide a new version of it and add additional features or change features based on user feedback. However, a user who downloads the software file does not necessarily receive any updates of the software unless the user specifically and manually updates it. Upon requesting an update, a server does not necessarily know the exact version of the software file that the user has and thus does not necessarily know which particular update to provide for that file.

Accordingly, a need exists for improved systems for distribution of digital information and for providing updates to files.

SUMMARY

A method and apparatus consistent with the present invention use an agent software application for controlling distribution of files and managing updates to files. The agent automatically downloads files upon request by a user and can download a file in multiple portions by tracking an amount of a received portion of the file.

The method and apparatus include transmitting a request to download a file, the request including an identification of the file and an indication of starting point for transmission of the file. A serial transmission of digital information for the file is received beginning at the starting point, and the digital information is appended to a previously-received portion of the file, if present. The received digital information is also stored.

The agent can also search for updates to files by using application signatures to uniquely identify files stored on a user's machine and transmitting the application signatures to a server storing the updates. In addition, the agent uses a number of screens for displaying information to a user concerning the downloading of files and updates to files. The screens also permit the user to enter schedule information to control downloading of files and searching for updates to files.

DESCRIPTION OF THE DRAWINGS

FIGS. 5a and 5b are a flow chart of a home screen routine for implementing an agent to manage distribution of digital information and file updates.

FIGS. 10-24 are diagrams of exemplary screens supported by the routines shown in FIGS. 5-9 and used to implement an embodiment of an agent for distribution of digital information and file updates.

FIG. 10 is a diagram of a home screen.
FIG. 11 is a diagram of a news and deals screen.
FIG. 12 is a diagram of a shopping screen.
FIG. 13 is a diagram of a customer service screen.
FIG. 14 is a diagram of a privacy screen.
FIG. 15 is a diagram of a general settings screen.
FIG. 16 is a diagram of a tour screen.
FIG. 17 is a diagram of a downloads screen.
FIG. 18 is a diagram of an install screen.
FIG. 19 is a diagram of a schedule downloads screen.
FIG. 20 is a diagram of a download help screen.
FIG. 22 is a diagram of an updates screen
FIG. 23 is a diagram of an updates help screen.
FIG. 24 is a diagram of an update status screen.

DETAILED DESCRIPTION

Overview

Figure 1:
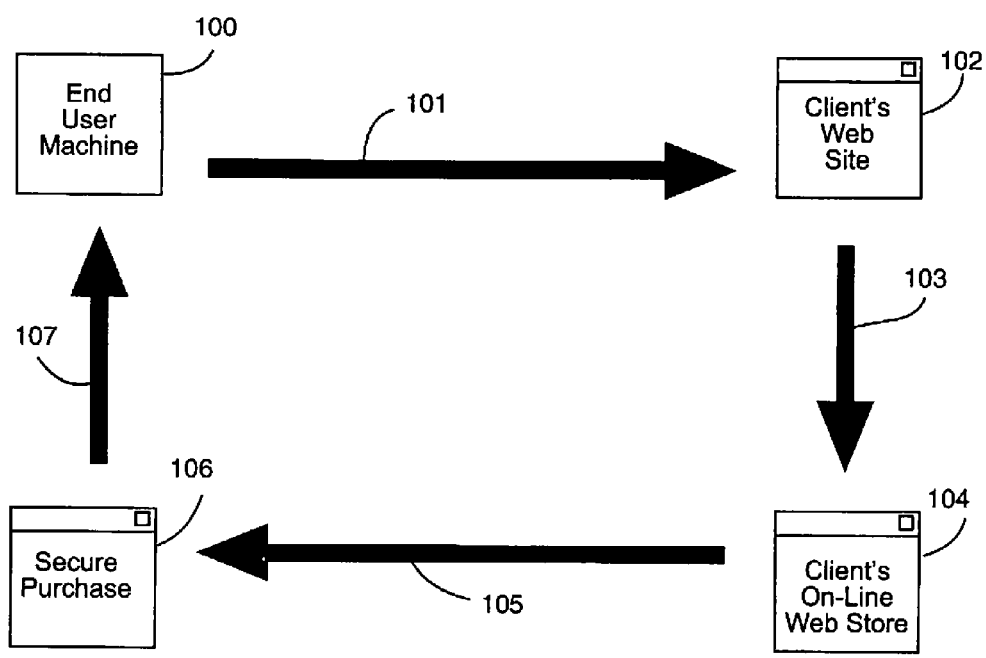
FIG. 1 is a block diagram of an environment for providing electronic commerce.

As shown in FIG. 1, an end user at computer 100 enters a particular client web site 102 through connection 101 in order to shop for products, which may include, but is not necessarily limited to, digital products. Digital products include any information capable of being represented in digital form; examples of digital products include, but are not limited to, the following: software applications; data, music, video, books, text, audio-visual information, multimedia information, graphical information, fonts, and artistic works.

The end user may view a page from the client's web site, for example, listing and describing various products. When the end user indicates a desire to purchase a product by, for example, selecting a purchase icon on the client's web page, the end user's connection 103 is transferred to a commerce network server providing the client's on-line web store 104, and this typically occurs as a background process. The end user may make a secure purchase 105 through page 106 from a product library and, as represented by arrow 107, the purchased product is delivered electronically over the network connection, physically such as by mail, or both electronically and physically.

The purchase typically involves the end user entering payment and related information, such as a credit card number and an associated name and address. In response, the commerce network server determines whether to accept the order and, if accepted, may provide a secure download of the purchased product to the end user's computer for digital products. Determining whether to accept or decline the order involves the use of accessing information concerning prior attempted purchases using information related to or associated with the information in the order, and determining from the related or associated information the likelihood that the order involves a fraudulent attempt to obtain products. Although only one computer 100 and web site 102 are shown, a commerce network server may provide multiple on-line web stores 104 and may interact with end users at multiple computers and multiple web sites.

Electronic Commerce System and Process

Figure 2:
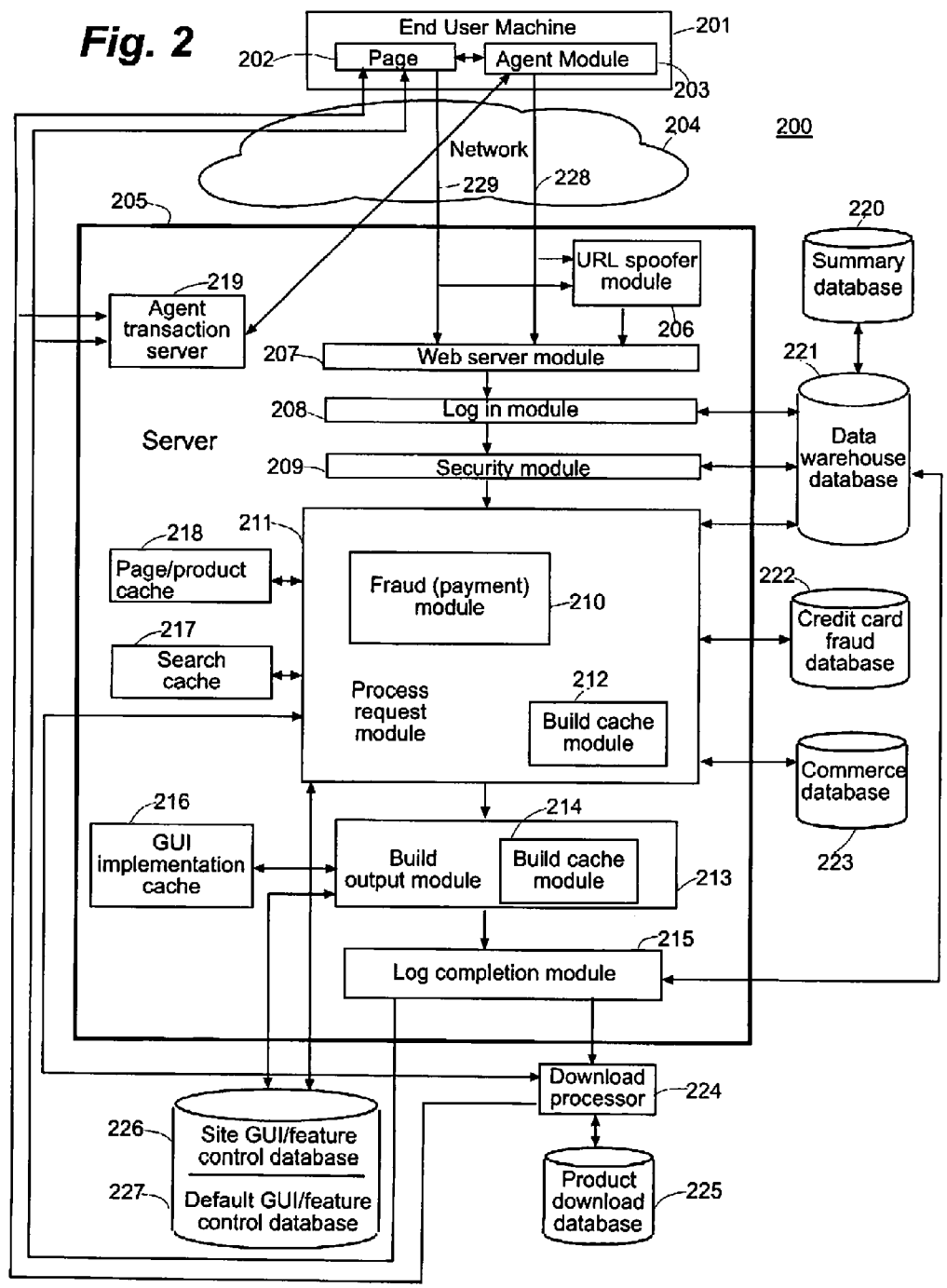
FIG. 2 is a block diagram of an electronic commerce system.

FIG. 2 is a block diagram of an electronic commerce system 200 illustrating interaction between an end user machine 201 and a server 205, illustrating exemplary software modules, caches, and related databases. Server 205 may correspond with the commerce network server described above providing on-line web stores. As shown, end user machine 201 interacts through network 204, such as the Internet or other type of network, with server 205. End user machine 201 may also access a web page on an intermediate server and subsequently be transferred to server 205. End user machine 201 may interact directly with server 205 or interact through an agent module 203, which performs processing specific to a user at end user machine 201. End user machine 201 transmits a request 228 or 229 to server 205 from agent module 203 or page 202, possibly including a request for a particular web page, a request to purchase and download a digital product, or a request for a search for a particular product. Although only one end user machine 201 is shown, server 205 may interact via network 204 with multiple end user machines and multiple intermediate servers maintaining web sites accessed by users at the end user machines. Other examples of systems providing electronic commerce are disclosed in the following United States patents, all of which are incorporated herein by reference as if fully set forth: U.S. Pat. No. 5,907,617; U.S. Pat. No. 5,903,647; U.S. Pat. No. 5,887,060; U.S. Pat. No. 5,883,955; U.S. Pat. No. 5,883,954; and U.S. Pat. No. 5,870,543.

In server 205, the request may be transmitted through a uniform resource locator (URL) spoofer module 206, which performs initial processing of the URL. In particular, URL spoofer module 206 changes the URL so that if a user subsequently downloads a product, end user machine 201 by default saves the product under a file name associated with the product but gives no direct access to the physical location on the server. It may also misdirect the user in order to detect attempts to fraudulently obtain products. Alternatively, the request may be transmitted directly to a web server module 207, which performs initial processing on the request.

A log in module 208 receives the request and records certain data associated with the request, such as the user's request, Internet Protocol (TIP) address, date and time, and particular demographic information. The request is then transmitted to a security module 209, which uses heuristics and other techniques in order to detect a person attempting to bypass particular steps of the process, or otherwise receive or access the products without providing payment.

A process request module 211 first checks a page/product cache 218 to determine if the requested web page has been previously requested or, if applicable, the relevant product has been previously requested. If so, process request module 211 accesses information in page/product cache 218 in order to avoid repeatedly generating the same information for the same or a similar request. If applicable, process request module 211 also checks a search cache 217. A build cache module 212 within process request module 211, if applicable, builds information for storage in either of the caches. Downloaded pages are dynamically built, and only certain pages use information from the page cache or search cache.

A fraud (payment) module 210, typically within process request module 211, performs processing necessary to conduct the payment transaction, including processing of credit card information. It also records payment-related information.

A build output module 213 next assembles information for the request. It first checks a graphical user interface (GUI) implementation cache 216 to determine if a requested web page has been previously constructed and provided. If so, it may use the information in GUI implementation cache 216 to avoid unnecessary repeated processing of the same information. If applicable, a build cache module 214 within build output module 213 creates information for storage in GUI implementation cache 216.

A log completion module 215 performs final processing on the request. If the request is only for a web page or search, log completion module 215 transmits the web page or search information back to end user machine 201. If end user machine 201 uses agent module 203, log completion module 215 may transmit information to an agent transaction server 219, which constructs and creates the web page based upon that information and transfers it back to agent module 203 for construction of the web page at page 202 on end user machine 201.

If the request included a request for a product, log completion module 215 transmits the request to a download processor 224, which checks with process request module 211 to verify the authenticity of the request and perform a security check. If the request is valid, as determined by information transmitted back from process request module 211, download processor 224 securely transmits the requested product from a product download database 225 to end user machine 201. The transmitted product may be transmitted through agent transaction server 219 if end user machine 201 uses agent module 203.

The following provides a description of each database shown in FIG. 2. A data warehouse database 221 provides log in information along with keys, which provides an index to associated information in a commerce database 223. Commerce database 223 contains data tables storing information related to products and requests, such as a product table, order table, and other such tables. A summary database 220 provides information from the data warehouse database in summary form. Product download database 225 provides products in digital form for retrieval by the download processor. This configuration provides the advantage of storing the products without wrappers or associated passwords, and instead providing for a secure download of the products. Wrappers or associated passwords may still be used, if desired.

A site GUI/feature control database 226 and default GUI/feature control database 227 may be accessed by process request module 211 and build output module 213 for storage and retrieval of information related to web sites.

A credit card fraud database 222 stores credit card transaction information, including credit card processing history, and other information for adaptive fraud screening. Such information may thus be used in performing another security check. For example, the database may store a list of stolen credit card numbers.

Figure 3:
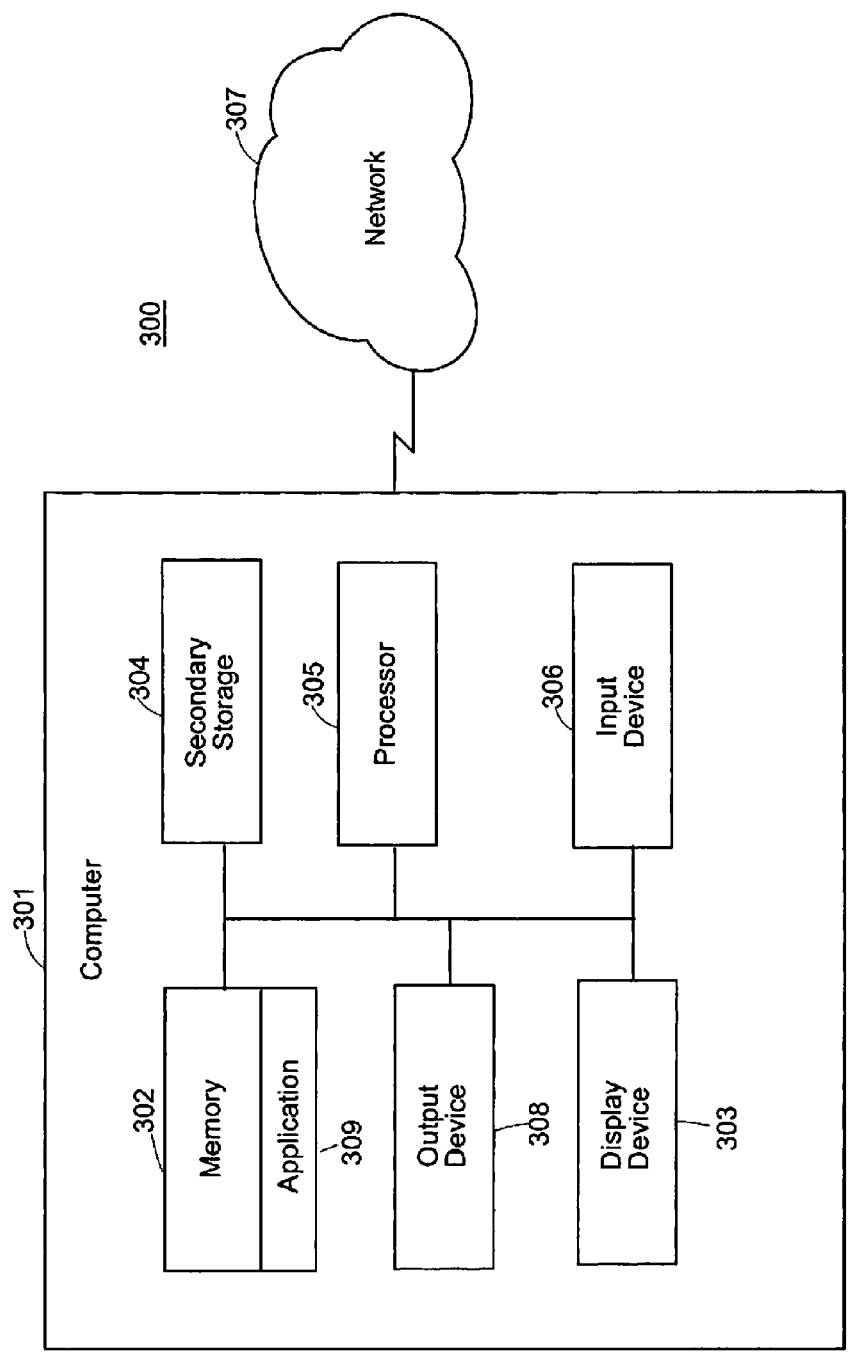
FIG. 3 is a block diagram of exemplary hardware components of an electronic commerce system.

FIG. 3 depicts an exemplary data processing system 300 with a computer 301 illustrating exemplary hardware components of end user machine 201, server 205, and an intermediate server, if used to transfer the end user's connection. Computer 301 includes a connection with a network 307 such as the Internet or other type of network, which may correspond with network 204. Computer 301 typically includes a memory 302, a secondary storage device 304, a processor 305, an input device 306, a display device 303, and an output device 308.

Memory 302 may include random access memory (RAM) or similar types of memory, and it may store one or more applications 309 for execution by processor 305. Applications 309 may correspond with the modules shown in FIG. 2. Secondary storage device 304 may include a hard disk drive, floppy disk drive, CD-ROM drive, or other types of non-volatile data storage, and it may correspond with the various databases shown in FIG. 2. Processor 305 may execute applications or programs stored in memory 302 or secondary storage 304, or received from the Internet or other network 307. Input device 306 may include any device for entering information into computer 301, such as a keyboard, cursor-control device, or touch-screen. Display device 303 may include any type of device for presenting visual information such as, for example, a computer monitor or flat-screen display. Output device 308 may include any type of device for presenting a hard copy of information, such as a printer, and other types of output devices include speakers or any device for providing information in audio form.

Although computer 301 is depicted with various components, one skilled in the art will appreciate that this computer can contain additional or different components. In addition, although aspects of an implementation consistent with the present invention are described as being stored in memory, one skilled in the art will appreciate that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling a computer system, such as computer 301, to perform a particular method.

Figure 4:
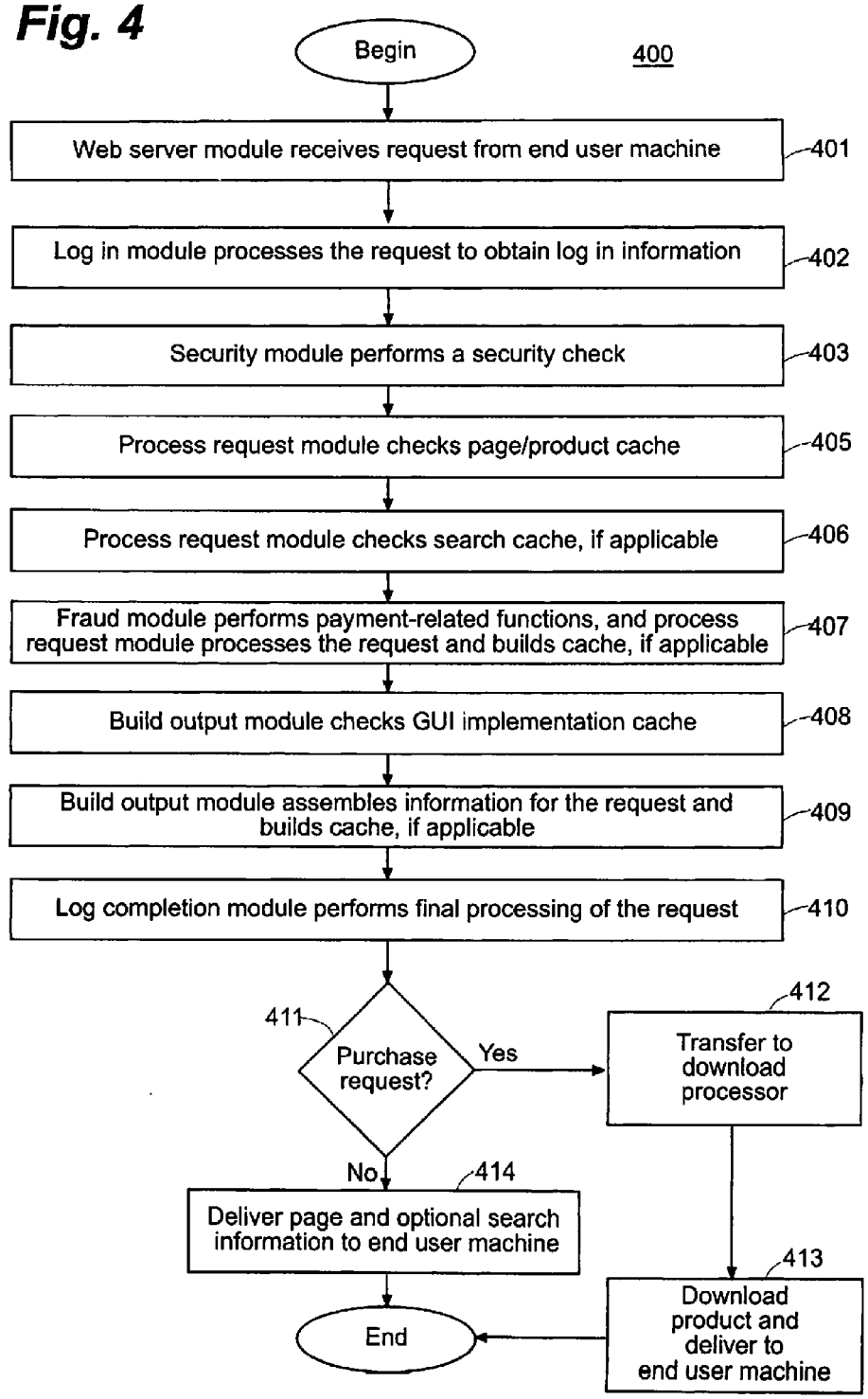
FIG. 4 is a flow chart of processing for an electronic commerce system.

FIG. 4 illustrates high-level processing 400 through electronic commerce system 200. In process 400, web server module 207 receives a request from end user machine 201 (step 401). Log-in module 208 processes the request to obtain log information (step 402). Security module 209 performs a security check (step 403). Process request module 211 checks page/product cache 218 (step 405) and checks search cache 217, if applicable (step 406). Fraud module 210 performs payment-related functions and process request module 211 processes the request and uses build cache module 212 to build a cache, if applicable (step 407). Build output module 213 checks GUI implementation cache 216 (step 408), assembles information for responding to the request, and uses build cache module 214 to build a cache, if applicable (step 409).

Log completion module 215 performs final processing of the request (step 410), and it determines if the request is a purchase request (step 411). If so, it transfers the request to download processor 224 (step 412), which securely downloads the requested product and delivers it to the end user machine 201 (step 413). If the request was not a purchase request as determined by step 411, log completion module 215 delivers page and optional search information to end user machine 201 (step 414).

Commerce System

This feature of electronic commerce system 200 involves providing a single transaction point for processing of electronic commerce, generally involving the series of modules shown in FIG. 2. Examples of the processing in this single transaction point include security, checking for fraud, online reporting, and processing orders. The benefits of providing such processing through a single transaction point typically include, for example, scalability, reliability of processing, simplicity of design by avoiding multiple disparate systems, and avoiding repeated processing.

Fraud Detection and Prevention

This feature of electronic commerce system 200 involves preventing fraud and ensuring security during electronic commerce transactions. An electronic commerce transaction involves a user electronically requesting purchase of a product and providing payment for the product. The user may receive the product electronically for digital products or may receive it by other means such as via mail service. The terms fraud and fraudulent refer to attempts by a user to obtain a product without providing proper payment, or otherwise not satisfying requirements for obtaining a product. For example, a user may attempt to use a stolen or false credit card number to obtain a product or attempt to tamper with the system so that the user obtains a product for less than the required price. As another example, certain information related to a user's order may tend to indicate that the user is likely to fail to provide payment, even if the credit card number used appears valid, and system 200 attempts to make that determination based on an analysis of the user's information and associated information.

The fraud detection and prevention may also involve preventing users or customers from having access to certain stored data such as credit card information and products. It involves preventing users from bypassing particular modules or processing in system 200. Users typically interact with system 200 in a known manner for non-fraudulent transactions. Likewise, particular types of interaction tend to indicate that a user is attempting to circumvent system 200 and fraudulently obtain products. Therefore, system 200 analyzes a user's interaction, as well as a user's information submitted on an order typically using an order form and related information in a database, in order to determine a likelihood or probability that the user is engaging in attempted fraud during the transaction. That determination is used as a basis to either accept or decline the order.

The fraud detection and prevention features of system 200 generally include functions within the security and fraud (payment) modules 209 and 210, as further explained below. System 200 may implement modules 209 and 210, or a single module or any number of modules to implement the features, using software stored in memory 302 or secondary storage 304 for execution by processor 305. Modules 209 and 210 may also be implemented using program products or a combination of software and specialized hardware components. In addition, the modules may be executed on multiple processors for processing a large number of transactions, if necessary or desired.

An exemplary implementation of modules 209 and 210 for fraud detection and prevention is disclosed in U.S. application Ser. No. 09/372,253, filed Aug. 11, 1999, and entitled "Apparatus and Method for Adaptive Fraud Screening for Electronic Commerce Transactions."

Global Web Site Management

This feature of electronic commerce system 200 involves providing centralized management of host sites, managing all host sites through a central database. It may include, for example, extending a look and feel of a particular web site into another web site. For example, when an intermediate server transfers an end user's connection to a commerce network server, as described with respect to FIG. 1, the commerce network server may transmit a page having the same look and feel as the page on the intermediate server, thus providing an apparent seamless transition to the end user.

This feature also may include making local changes to a large number of managed web sites. Therefore, instead of making similar changes to each individual web site, system 200 may broadcast those particular changes and make the corresponding changes to the managed web sites. It thus provides an advantage, for example, of easily making changes to a large number of web sites. For example, it may automatically broadcast a few particular features every week to the managed web sites in order to regularly update the sites.

Security Area

This feature of electronic commerce system 200 provides for securely storing clients' products and providing a secure download process, typically without the use of wrappers or passwords. This feature generally involving the series of modules shown in FIG. 2. It includes a database type of security intended at least to simplify the purchase process for a user. A user typically need only enter a credit card number and in response receives a requested product.

Cache Management for Dynamic Web Pages

This feature of electronic commerce system 200 concerns a dynamic cache providing for a fast page response and dynamic pages, typically guaranteeing that pages contain current information. It generally involves caches 216, 217 and 218 shown in FIG. 2, providing cache processing for three areas: product searching; GUI implementation (particular features on a web page); and static page building (a web page as a whole).

The complexity of product searching often affects speed of a response. Providing caching of information means that the same information need not be repeatedly retrieved from an external database and constructed into a responsive web page. Rather, the information may be cached locally and quickly retrieved in response to the same or a similar request. This feature maintains up-to-date information by knowing to create and destroy information interactively for the caches.

Intelligent Agent

An intelligent agent includes an application that resides locally on a client machine in order to perform processing specific to a user of the machine, generally involving agent module 203 and agent transaction server 219 shown in FIG. 2. It includes at least two aspects, a pull side and a push side. The pull side involves the agent obtaining information and knowing how to link to a server and provide the information to the user in a personal way, customized for that user. It shields the user from the order process, for example, in order to simplify it. The agent may also perform system management, for example, performing a background process that scans the user's system in order to manage licensed software, perform archival control, and perform other such processing.

The push side involves making special information available to the user through the agent. For example, if the user already ordered a particular product, the agent may inform the user of any bugs in the product, product upgrades, or related products. That information is "pushed" to the agent from the server. The server may provide initial filtering of information given to the agents, and the agents perform additional filtering in order to present the information in a specific way to the user.

Therefore, an agent manages distribution and download of files including digital products to a user's machine, as well as locating and downloading updates to files contained on the user's machine. The term "file" refers to any type of digital product. A file may include associated information concerning the file, such as a name and size, which is possibly useful for downloading purposes. Alternatively, a file may include only a digital product itself or a portion of a digital product.

The agent can thus assist a user in managing the downloading of particular digital information, as well as provide recommendations concerning updates to files on the user's machine. An embodiment consistent with the agent may be implemented in software or program products within agent module 203 in user machine 201, and it may be included within agent modules on many particular end user machines interacting with server 205. FIGS. 5-9 are flow charts of routines for implementing an agent in agent module 203. The term "agent" refers to any software or other type of application for executing the functions in FIGS. 5-9.

FIGS. 10-24 are diagrams of screens supported by the routines in FIGS. 5-9. The term "screen" refers to any visual element or combinations of visual elements for displaying information; examples include, but are not limited to, user interfaces on a display device or information displayed in web pages or in windows on a display device. The screens may be formatted, for example, as web pages in HyperText Markup Language (HTML), or in any other suitable form for presentation on a display device depending upon applications used by users to interact with the system.

The screens include various sections, as explained below, to provide information or to receive information or commands. The term "section" with respect to screens refers to a particular portion of a screen, possibly including the entire screen. Sections are selected, for example, to enter information or commands or to retrieve information or access other screens. The selection may occur, for example, by using a cursor-control device to "click on" or "double click on" the section; alternatively, sections may be selected by entering a series of key strokes or in other ways such as through voice commands or use of a touch screen. In addition, although the screens shown in FIGS. 10-24 illustrate a particular arrangement and number of sections in each screen, other arrangements are possible and different numbers of sections in the screens may be used to accomplish the same or similar functions of displaying information and receiving information or commands. Also, the same section may be used for performing a number of functions, such as both displaying information and receiving a command.

Figure 5A:
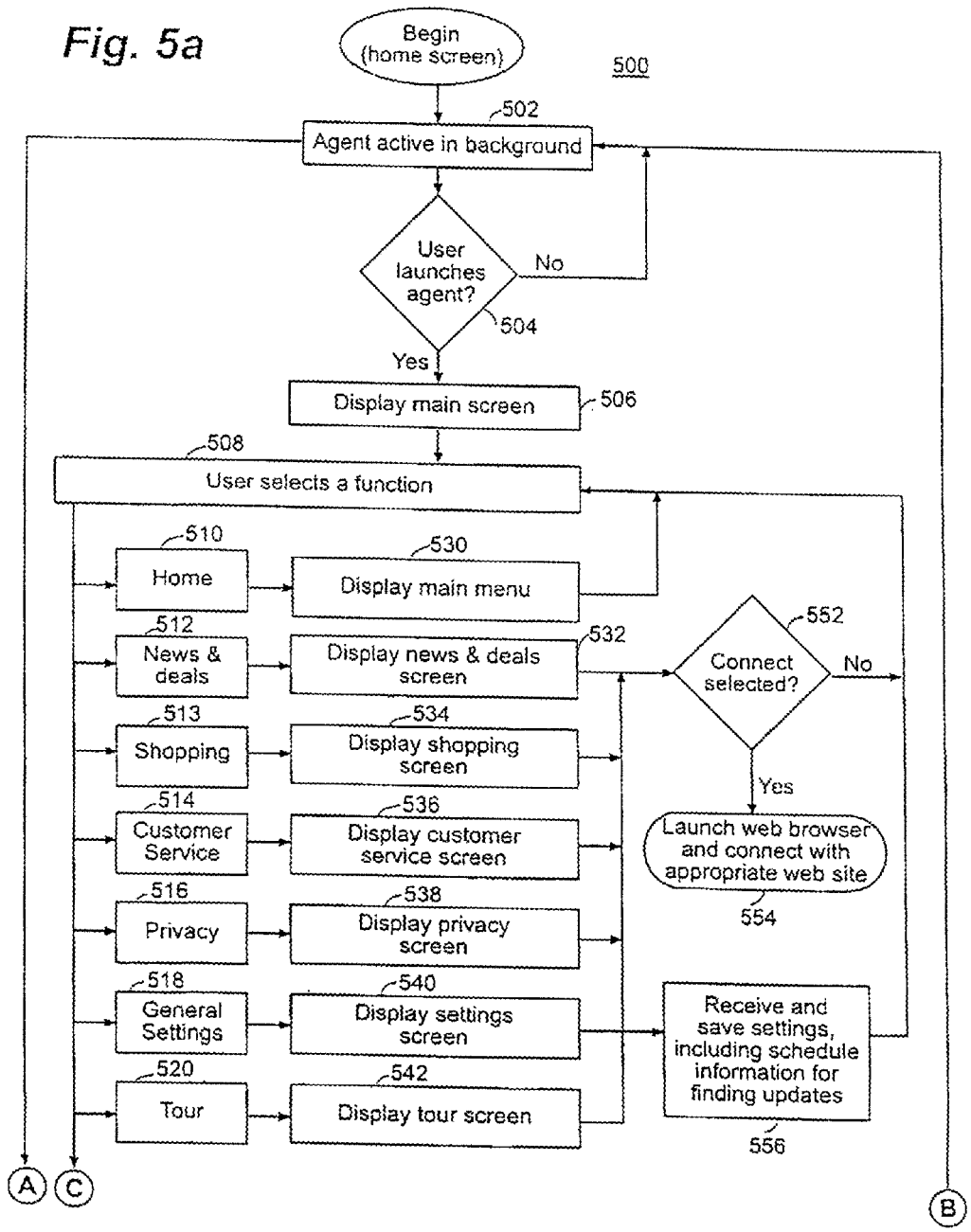

FIGS. 5a and 5b are a flow chart of a home screen routine 500 for the agent. Routine 500 supports a home screen 700 shown in FIG. 10. Home screen 700 is a main screen shown to a user upon launching the agent. In routine 500, the agent typically resides active as a background process on a user's machine (step 502). By remaining active in the background, the agent may automatically execute certain functions, as scheduled by the user and further explained below. The user launches the agent, as determined by step 504. The user may launch the agent in a number of ways such as, for example, selecting the agent from a start menu, executing a run command, or selecting the agent as represented by an icon in a system tray on the user's computer. If the user launches the agent, the agent displays home screen 700 (step 506). The term "eBot" is a trademark of Digital River, Inc.

Home screen 700 includes a section 701 for use in providing information to the user and receiving information from the user. From home screen 700, a user may select a function by selecting a particular section of home screen 700 shown in FIG. 10 (step 508). Selection of home section 704 (step 510) causes display of home screen 700 (step 530). Selection of news and deals section 706 (step 512) causes display of a news and deals screen 726 shown in FIG. 11 (step 532). News and deals screen 726 illustrates an example of providing particular information in section 701 to users. News and deals screen 726 typically includes a section 727 by which a user may connect with a particular web site as related to the information within section 701. The agent determines if the user selects section 727 (step 552); if so, the agent launches a web browser on the user's machine and connects with the appropriate web site (step 554). The agent may work with any type of web browser or other application executed by user machine 201 for network or Internet communication; examples of web browsers include the Netscape Navigator program and the Microsoft Internet Explorer program.

Figure 12:
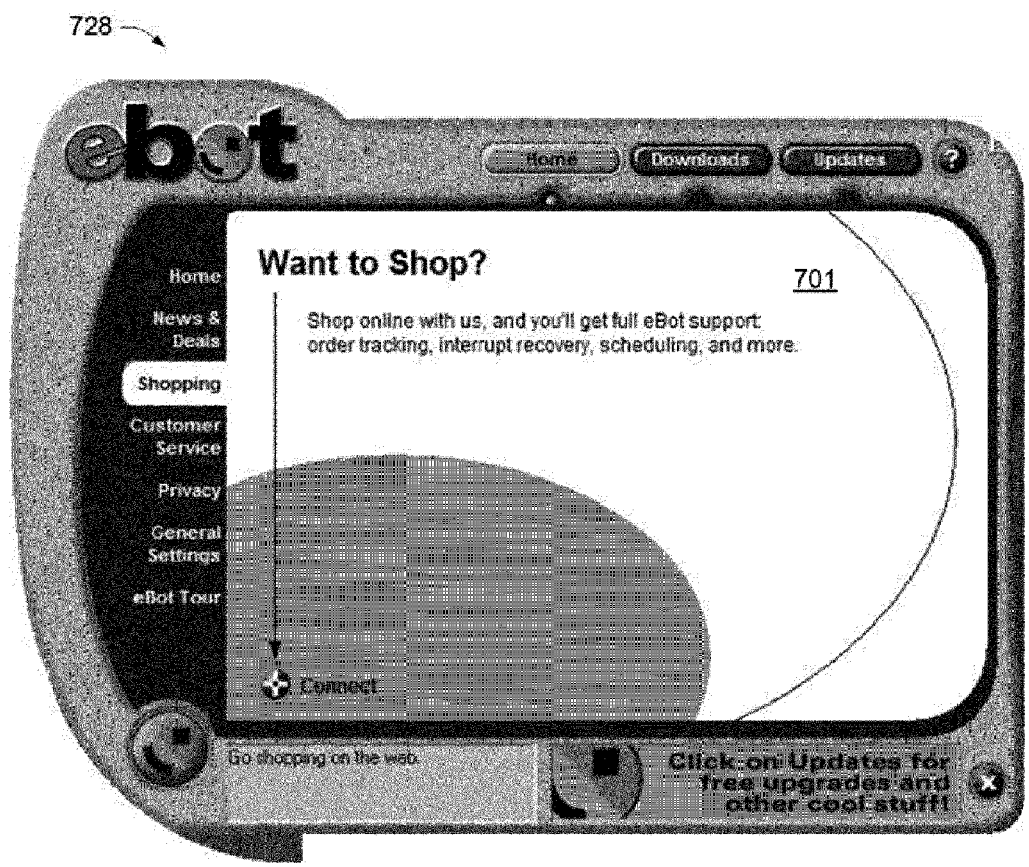

Selection in home screen 700 of a shopping section 708 (step 513) causes display of a shopping screen 728 shown in FIG. 12 (step 534). Shopping screen 728 permits display of information related to on-line shopping within section 701. In addition, shopping screen 728 typically includes a connect section 730 by which a user may connect with a particular web site. From shopping screen 728, the agent determines if the user selects connect section 730 (step 552); if so, the agent launches the web browser and connects with the appropriate web site for on-line shopping (step 554). The agent may store and associate connect section 730 with a URL or a uniform resource indicator (URI) for use in accessing a particular web site.

Figure 13:
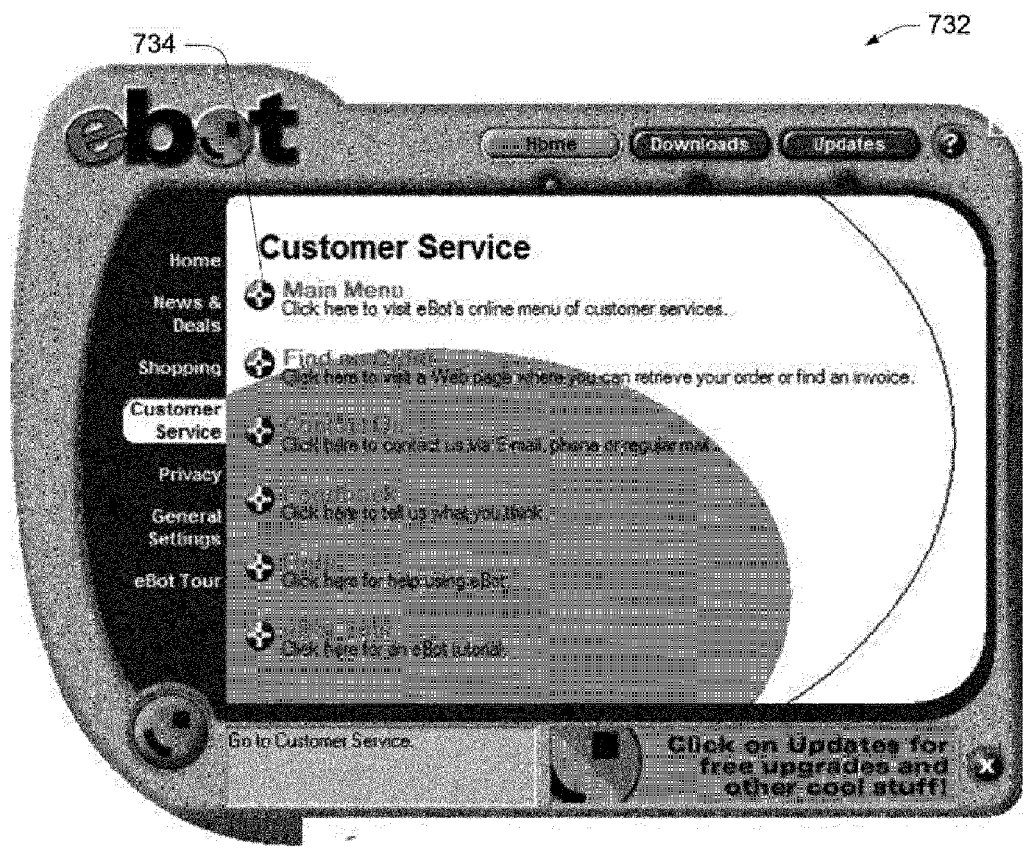

In home screen 700, selection of a customer service section 710 (step 514) causes display of a customer service screen 732 shown in FIG. 13 (step 536). Customer service screen 732 provides for display of information to a user concerning operation of the agent. It typically includes a plurality of connect sections 734 for a selection by a user in order to connect with an appropriate web site in order to obtain customer service information. Therefore, from customer service screen 732 the agent determines if a user selects one of the connect sections 734 (step 552); if so, the agent launches a web browser and connects with an appropriate web site for customer service information (step 554).

Figure 14:
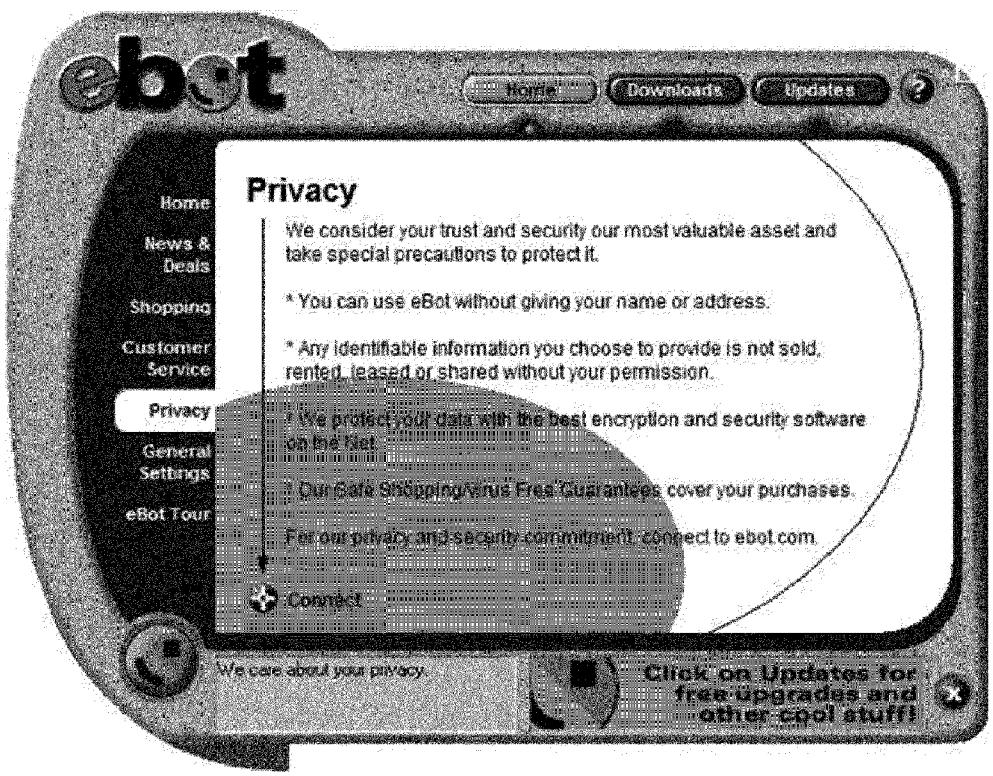

From home screen 700, selection of a privacy section 712 (step 516) causes display of a privacy screen 736 shown in FIG. 14 (step 538). Privacy screen 736 permits display of information to a user concerning the privacy of the information used by the agent for downloading information and providing for file updates. Privacy screen 736 also typically includes connect section 730 for connection with a web site to obtain information concerning privacy. From privacy screen 736 the agent determines if the user selects section 730 (step 552), and if so, the agent launches a web browser and connects with an appropriate web site for providing privacy information to a user (step 554).

Figure 15:
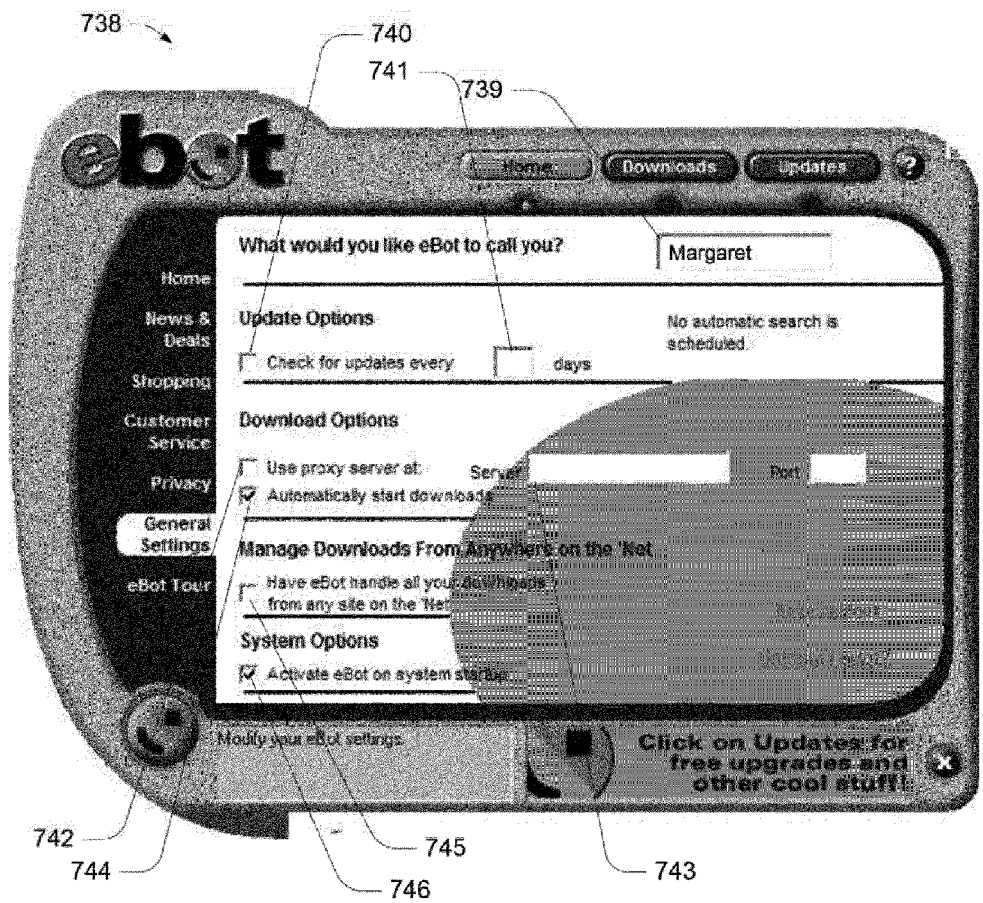

From home screen 700, selection of a general settings section 714 (step 518) causes display of general settings screen 738 shown in FIG. 15 (step 540). From general settings screen 738, the agent receives and saves settings as entered by the user, including schedule information for finding updates (step 556). In particular, general settings screen 738 includes a name section 739 in which a user may enter a name or other identifier. Selection of a section 740 permits the user to instruct the agent to search for updates on a periodic basis. In particular, the user may enter a number of days in section 741 by which they want the agent to automatically search for update to the files on the user's machine, as explained below. Using the information in section 741, the agent automatically searches for updates to the files on the user's machine using a connection with server 205 based upon the days parameter in section 741. Instead of using a number of days parameter, the agent may alternatively search for updates on a different periodic basis such as the first day of every month, or at a particular time and day each week or month.

Selection of a section 742 permits the user to specify a particular proxy server for downloads as entered in section 743 identifying a server and port for use with the web browser. Selection of a section 744 permits the user to specify automatic downloads such that the agent will automatically download a file without prompting the user for permission. Selection of a section 745 permits the user to instruct the agent to download from any web site on the Internet through server 205. Selection of a section 746 permits the user to instruct that the agent software be activated upon system start-up of the user's machine.

Figure 16:
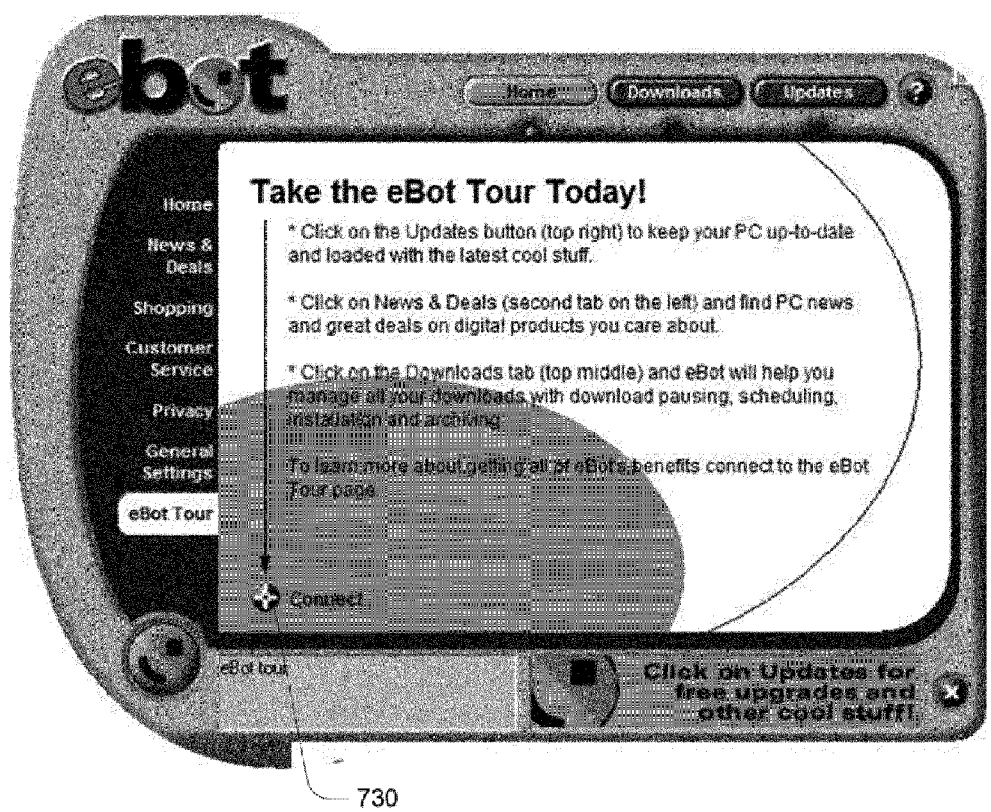
Figure 17:
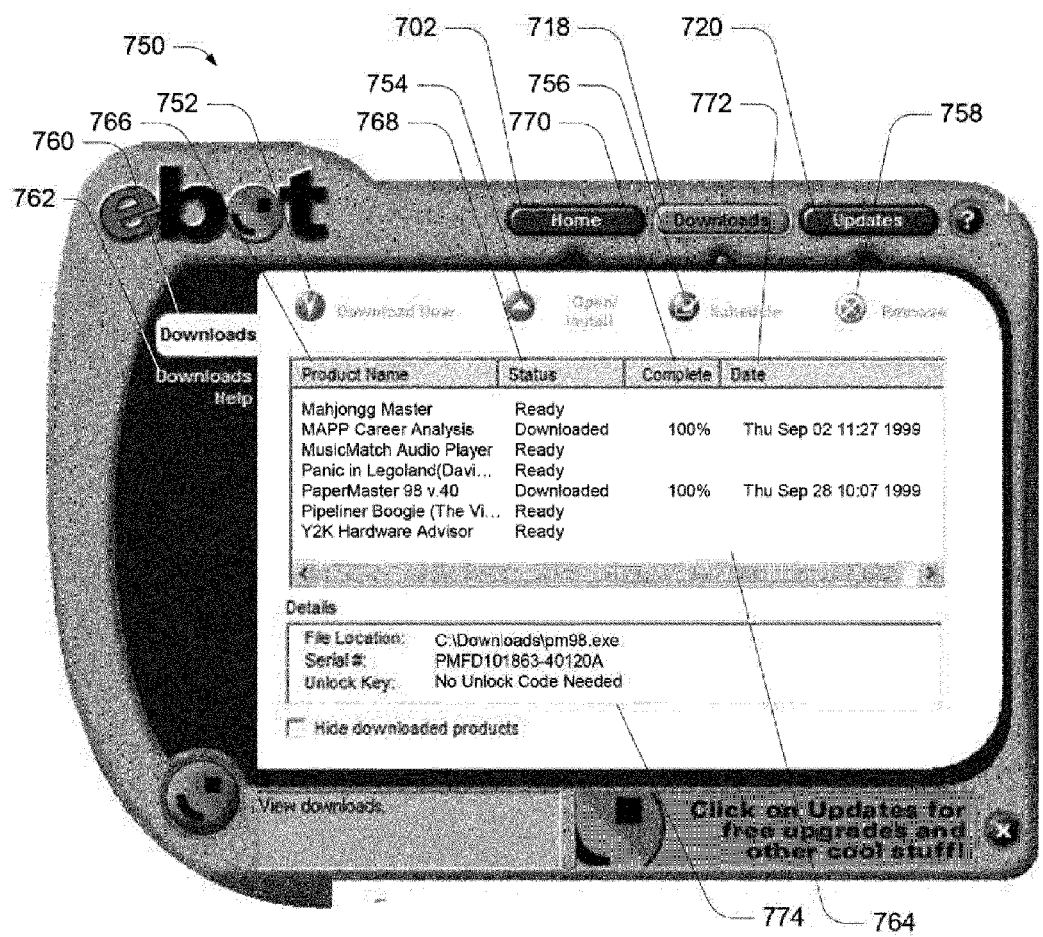
Figure 18:
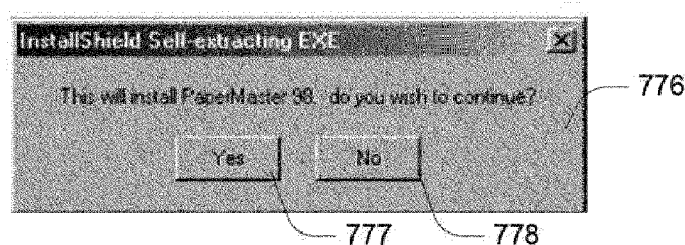
Figure 19:
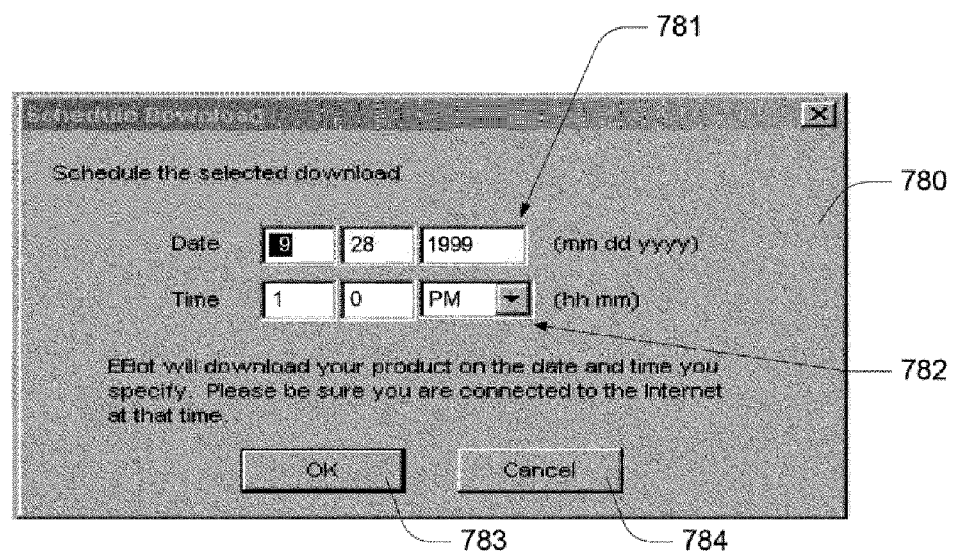

From home screen 700, a selection of a tour section 716 (step 520) causes display of a tour screen 748 shown in FIG. 16 (step 542). Tour screen 748 permits the agent to display information concerning its operation to the user. The user may typically obtain more information concerning operation of the agent by selecting connect section 730 in order to connect with an appropriate web site. Therefore, on tour screen 748 the agent determines if the user selects connect section 730 (step 552); if so, the agent launches a web browser and connects with an appropriate web site in order to provide information concerning its operation (step 554).

From home screen 700, selection of a downloads section 718 (step 552) causes execution of a downloads screen routine (step 554), as further explained below. Selection of an updates section 720 in home screen 700 (step 524) causes execution of an update screen routine (step 546), as further explained below. A banner section 722 in home screen 700 permits the agent to display advertising or other information to a user. The user may select the banner in order to connect with a corresponding web site and obtain more information or shop on-line for products or services. Therefore, a selection of banner section 722 (step 526) causes the agent to launch a web browser and connect with an appropriate web site as determined by network address information, such as a URL, associated with the banner (step 548). If the user selects a close section 724 (step 528), the agent closes home screen 700 (step 550).

The agent may also be programmed or instructed by the user to automatically perform downloads of files and search for file updates using time parameter information. The agent monitors a current date and time, and compares it with schedule information to detect occurrence of a particular date and time (step 557). The agent can monitor a current date and time by accessing an internal calendar and clock for user machine 201 on which it runs.

The agent determines if the user has scheduled a particular function (step 558). That determination may be based upon comparing stored time parameter information as entered by a user with time information as determined by settings on a user's machine, as monitored in step 557. If the user has scheduled a particular download for this time (step 560), the agent executes a downloads routine based on the scheduled information (step 562). If the user has scheduled an update for this time (step 564), the agent executes a find updates routine based upon the scheduled information (step 566). In order for the scheduled function to occur, the agent software typically must be active as a background process such that it is operational and the user's machine must maintain or provide for a network connection such that the agent may automatically perform the downloads and search for the file updates through the network connection without requiring further interaction by the user.

Figure 6:
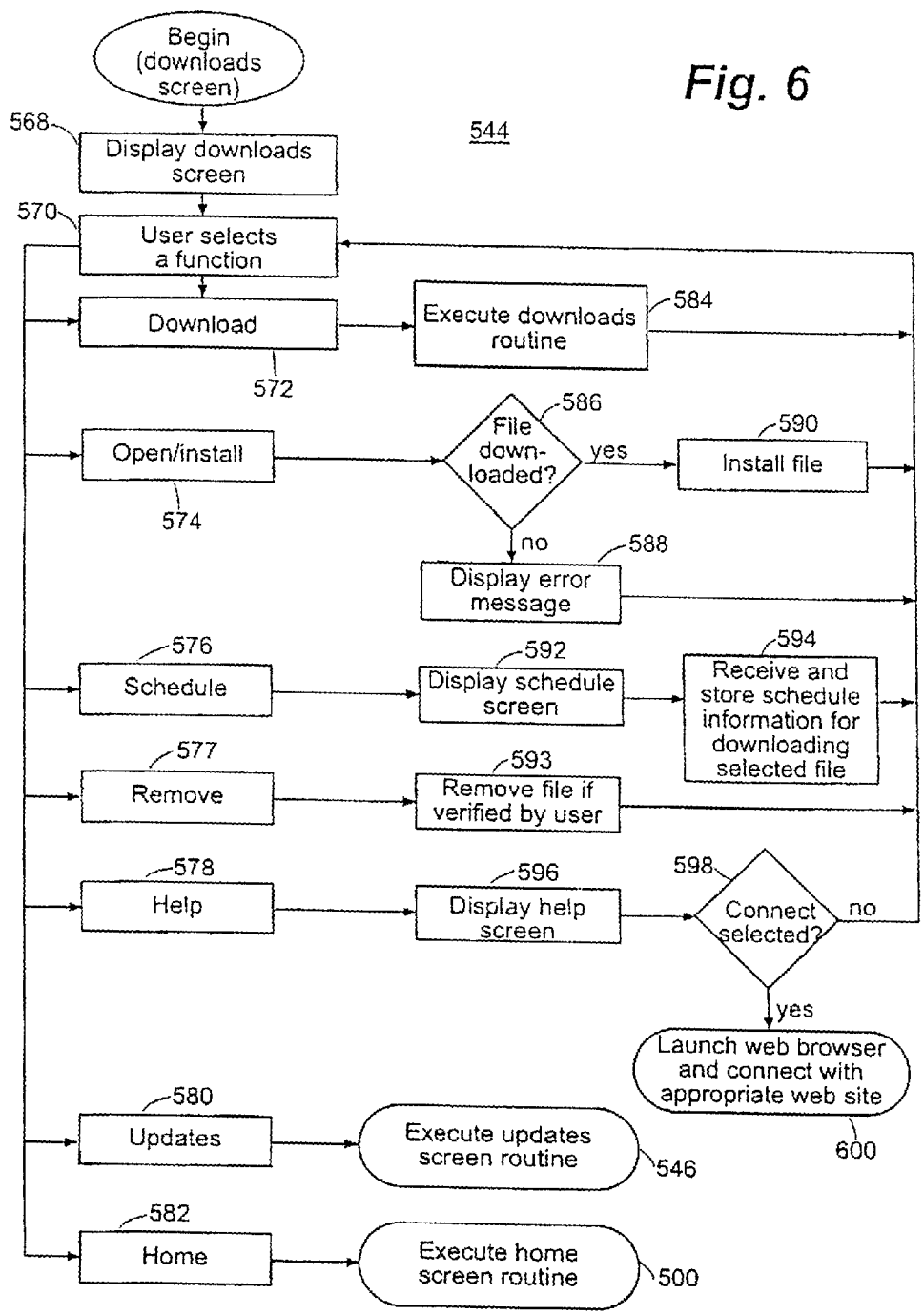
FIG. 6 is a flow chart of a downloads screen routine for the agent.

FIG. 6 is a flow chart of downloads screen routine 544 activated upon the user's selection of downloads section 718 in home screen 700. Upon selection of downloads section 718, the agent displays a downloads screen 750 shown in FIG. 17 (step 568). Downloads screen 750 includes a number of sections for providing status information to a user concerning downloads 21, and for a user to instruct the agent to perform certain operations concerning downloads. In routine 544, a user selects a function within downloads screen 750 (step 570), and the agent in response executes the selected function. Selection of a download section 752 causes execution of a downloads routine (step 584), as further explained below. For the download information, downloads screen 750 provides a status section 764 having status information concerning files. In particular, a name column 766 provides a listing of file names, a status column 768 provides identification on the status of each file, a completion column 770 provides information concerning an amount of the file downloaded, if any, and a date section 772 provides date information concerning when the file was downloaded.

Status section 768, as shown, provides various types of status information, such as the following: a ready status indicates that the selected file is ready to be downloaded; a downloaded status indicates that the selected file has been successfully downloaded; an in progress status indicates that the selected file is currently being downloaded with completion column 770 providing an indication of the percentage downloaded; a cancelled status indicates that a request to download the selected file has been cancelled. A details section 774 provides information concerning a particular selected file in section 764. The highlighting indicates that a file in section 764 has been selected by a user, and the user may select the file in the same manner that a user selects a section.

In downloads screen 750, selection of an open/install section 754 (step 574) provides for the user to request installation of a particular file as selected in status section 764. In response, the agent determines if the requested file has been downloaded (step 586). If the file has not been downloaded, the agent may provide an error message to the user indicating that the file must first be downloaded before it can be installed (step 588). If the file has been successfully downloaded, the agent installs the file (step 590). Installation of the file typically requires any conventional installation permitting for execution of the file by user machine 201. Prior to installation, the agent may display an install screen 776, shown in FIG. 18, requesting that the user confirm whether to install the selected file or not through a selection of section 777 to confirm installation or selection of a section 778 cancel installation.

Selection of a scheduled section 756 in downloads screen 750 permits the user to schedule downloading of a file selected in status section 764. Selection of schedule section 756 (step 576) causes display of a schedule download screen 780 shown in FIG. 19 (step 592). Using schedule download screen 780, the agent receives and stores schedule information for the selected file for downloading a selected file (step 594). Schedule information includes any type of date-based or time-based information for use in scheduling downloading of files or searching for file updates. For example, a user may enter a date in date section 781 and a time in time section 782 in order to schedule a download for the selected file. By selecting section 783 the user confirms the schedule and by selecting a section 784 the user cancels the function.

Selection of a remove section 758 in downloads screen 750 causes removal of a selected file in status section 764. Upon selection of remove section 758 (step 577), the agent removes the file indication from status section 764 if verified by the user (step 593).

Figure 20:
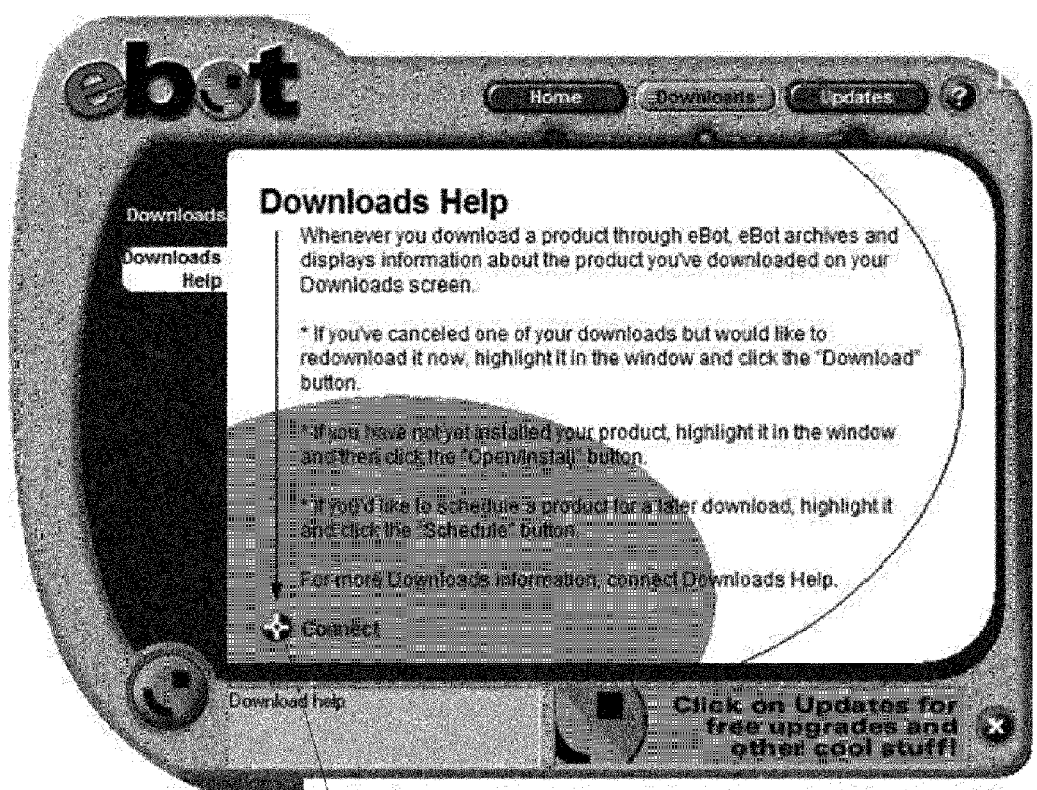

Selection of a help section 762 in downloads screen 750 (step 578) causes display of a help screen 786 shown in FIG. 20 (step 596). Downloads help screen 786 permits display of information concerning downloading of information to a user. It typically includes connect section 730 in order for the user to connect with the web site and obtain more help information. The agent determines if the user selects connect section 730 (step 598); if so, the agent launches the web browser and connects with the appropriate web site to obtain more help information (step 600).

In downloads screen 750, selection of an updates section 720 (step 580) causes execution of an updates screen routine (step 546), as further explained below. Selection of home section 702 (step 582) causes the agent to return to display home screen 700 and execute home screen routine 500.

Figure 7:
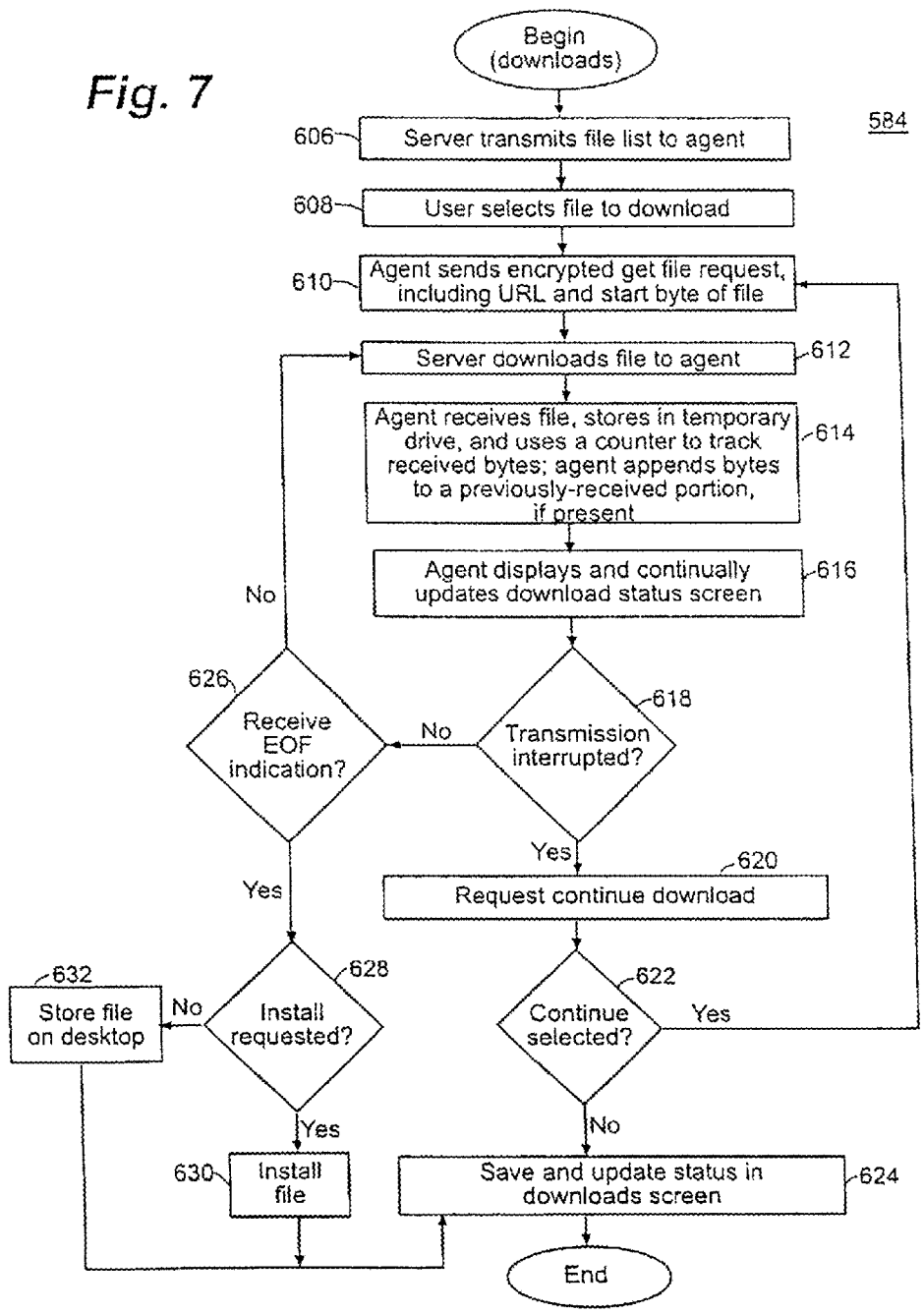
FIG. 7 is a flow chart of a downloads routine for distribution of digital information using the agent.
Figure 21A:
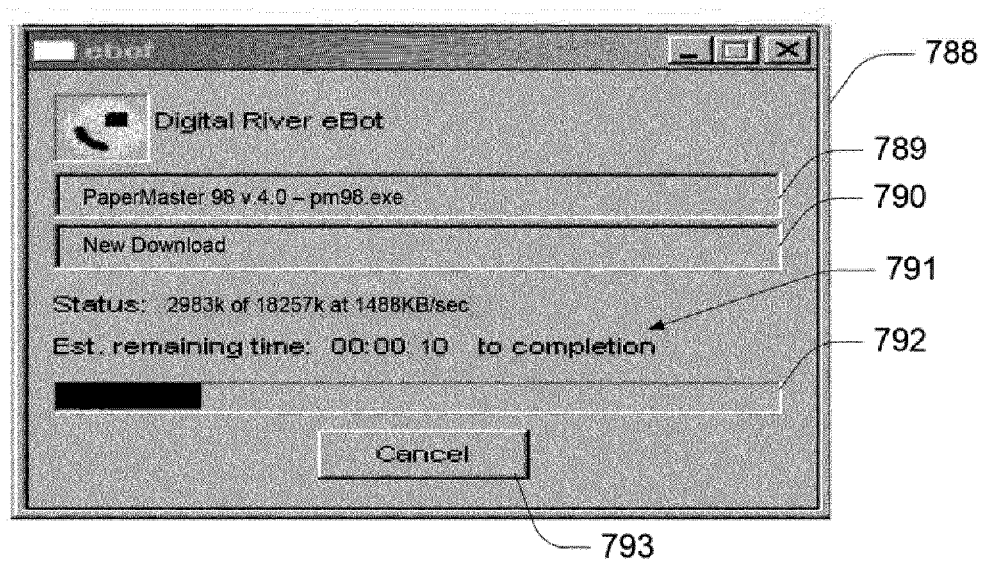
FIG. 21A is a diagram of a download status screen.

FIG. 7 is a flow chart of downloads routine 584 executed upon a user's selection of download section 752 in downloads screen 750 or based on schedule information as determined in steps 557 and 558. Upon selection of download section 752, the agent displays a download status screen 788 as shown in FIG. 21A. In downloads routine 584, server 205 typically transmits a file list to the agent (step 606). The file list provides for the identification of files in status section 764. The list may be transmitted one time or repeatedly transmitted and updated. The user selects a file in the file list download (step 608). Alternatively, the user may have preselected a file for downloading using schedule information. The agent sends a get file request to the server, including a URL and starting point of where to begin transmission of the file (step 610). In this example, the starting point is a start byte; however, the starting point may include any type of indication of where to begin transmission of the file. The agent may optionally encrypt the request using any type of encryption routine.

If this was the first time the file is requested to be downloaded, the start byte will be zero. By tracking start bytes, the agent may maintain an indication of an amount of the file downloaded and therefore need only request to download an additional portion if the download is interrupted. In response to the get file request, server 205 downloads the requested file to the agent by serial transmission of digital information for the file using conventional Transmission Control Protocol/Internet Protocol (TCP/IP) transmission (step 612). In this example, the serial transmission occurs through a stream of bytes for the file; however, it may occur through transmission of other forms of digital information such as, for example, bits, contiguous collections of bytes, or packets. The transmission may occur through any wireline or wireless network.

As the agent receives the file, it stores the file in a temporary folder on the user's machine such as "C:.backslash.temp.backslash." on the hard disk drive for the user machine, and it uses a counter to track receives bytes. It also appends the bytes to a previously-received portion, if present in the temporary drive, for downloading the file in multiple portions (step 614). It may store the bytes under a file name related to the file in order to detect a previously-received portion under the same name, if present. It may simultaneously store and append the bytes, or separately perform those steps. Also, instead of using the temporary drive, the agent may store the file in other drives or storage mediums.

Table 1 provides the levels of protocol used for the transmission.

TABLE 1

| level | protocol |
| --- | --- |
| 1 | Agent Transfer Protocol (ATP) |
| 2 | encryption |
| 3 | TCP/IP |

The ATP (level 1) includes the processing shown in downloads routine 584 (FIG. 7). The encryption protocol (level 2) provides for optional encryption of the transmitted bytes using various types of encryption such as triple Data Encryption Standard, referred to as 3DES. Level 3 includes the standard TCP/IP transmission of data over the Internet.

While the file is being downloaded, the agent displays and continually updates download status screen 788 (step 616). Download status screen 788, in particular, includes a file identification section 789 providing for identification of the file being downloaded, a status section 790 providing for an indication of the status of the file, whether a new download or a continued download, and a section 791 providing for additional status information such as a size of the file and an estimated remaining time to completion of the download. Section 791 also provides a visual indication of download in progress by continuously displaying the current number of bytes downloaded along with the total number to be downloaded. A section 792 provides for another visual indication of the download as in progress. In particular, it provides for an expanding status bar displaying essentially in realtime a relative indication of the amount that the file is downloaded. The status bar moves, for example, from left to right filling up section 792 until the file is completely downloaded. Selection of a cancel section 793 permits the user to cancel the download.

The agent may track a percentage or a relative amount downloaded by tracking received bytes and by knowing in advance a file size corresponding with the file. For example, conventional operating systems such as the Microsoft Windows program includes the ability to store file sizes in bytes associated with file names and potentially other information associated with the file such as a type of file and when the file was last modified. The agent continuously divides the received number of bytes by the file size in bytes to display the status bar and the percent downloaded.

Interruption of the transmission may occur in a number of ways such as, for example, through a user's selection of cancel section 793 in download status screen 788, through any type of loss of the network connection, or through software or web browser failure. For example, transmission interruption may occur if a user turns off power to the user machine, if the user machine otherwise experiences a loss of power, if the user disconnects it from the network, if a server or router for network transmission fails, or through any other type of software or hardware failure.

Figure 21B:
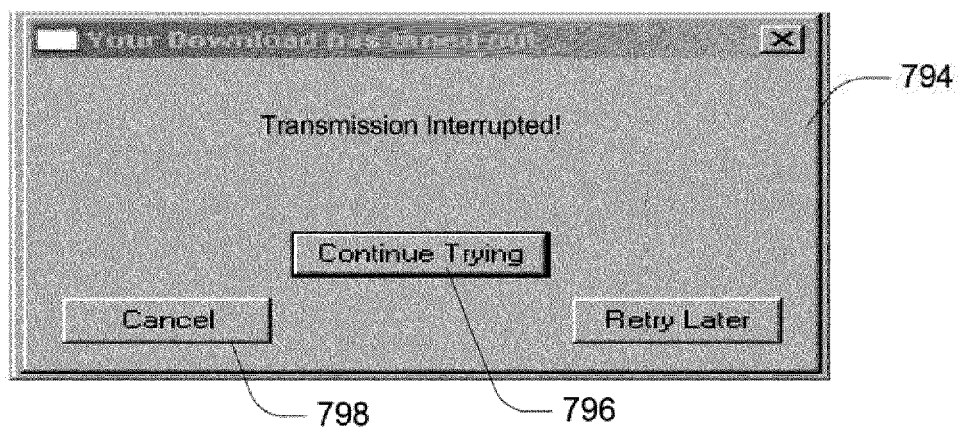
FIG. 21B is a diagram of a continue download screen.
Figure 22:
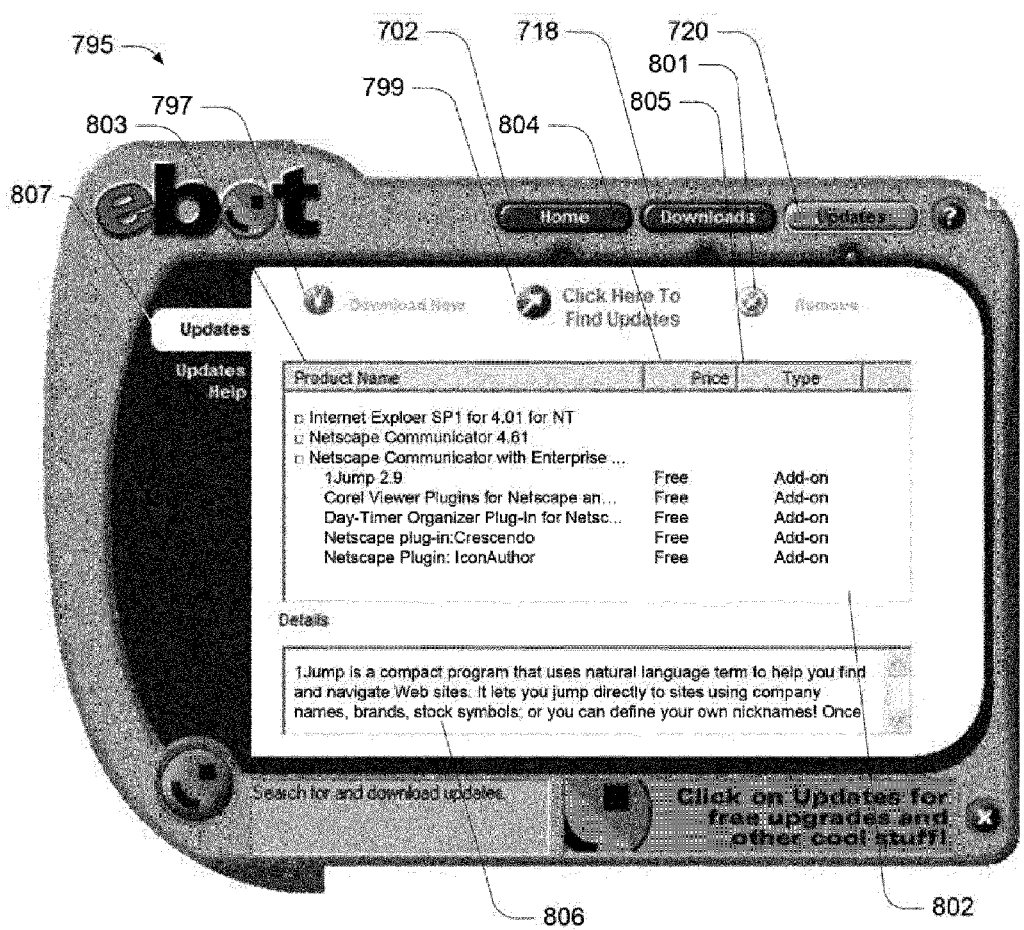
Figure 23:
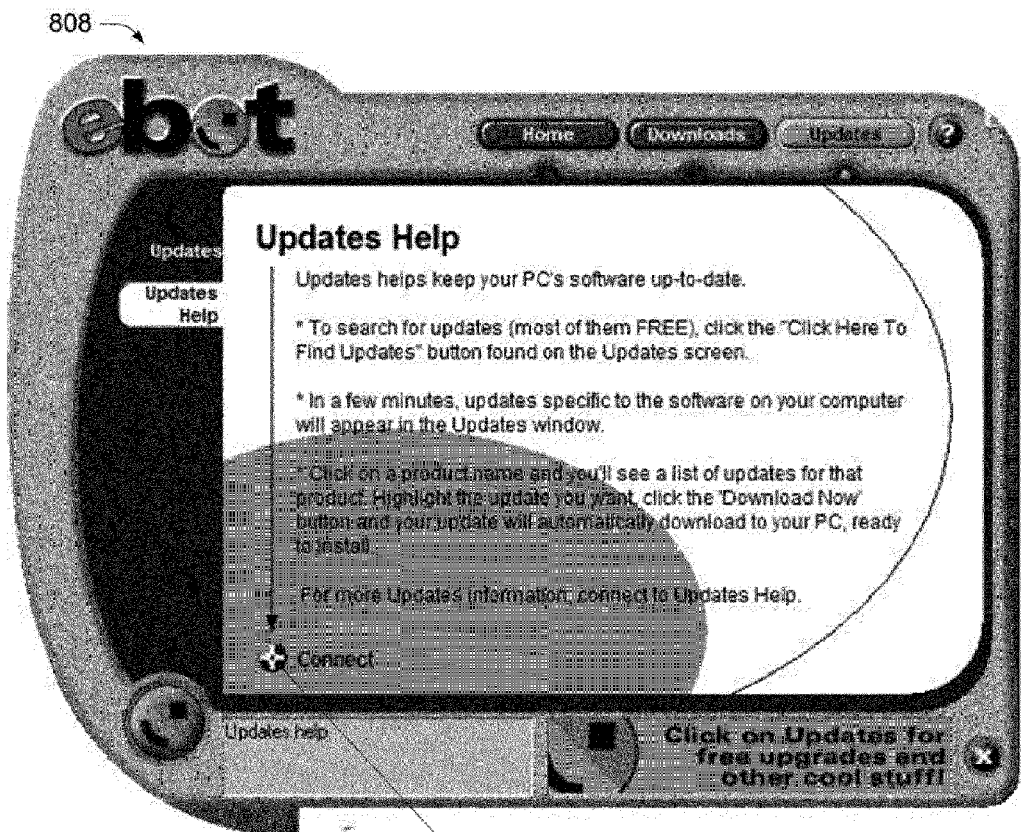

If the transmission was interrupted (step 618), the agent requests whether the user wishes to continue downloading (step 620). For example, the agent may display a continue download screen 794 as shown in FIG. 21B. Continue download screen 794 includes a section 796 for the user to select in order to continue the download and a section 798 for the user to select in order to not continue the download at this time. If the agent continues to download the same file at another time, it may search for the same file name in the temporary folder, along with the associated start byte number, in order to download only the remaining portion and append it to the previously-received portion before the interruption occurred. Continue download screen 794 may alternatively include another option to cancel the download and delete the portion of the file already received.

If the user wants to continue transmission (step 622), the agent sends another get file request including a URL of the file and start byte (step 610). Since the agent tracks received bytes, it may now continue transmission by the next start byte following the last byte received. In particular, the agent sets the starting byte to the number of the last byte successfully received plus one. The download process then continues in steps 612, 614, and 616, and the agent appends the remaining bytes to the previously-received portion of the file in the temporary folder, for example. If the downloading is not interrupted (step 618), the agent monitors the download to determine if it receives an end of file (EOF) indication (step 626); downloading continues while uninterrupted and until an EOF indication is received. The EOF may include any type of symbol, character, code, or other information providing an indication that the end of the file has been reached.

Once the agent receives the EOF indication, it has successfully downloaded the file, and it requests whether the user wishes to install the file (step 628). The agent may, for example, display installation screen 776 (FIG. 18) in order to request installation. If the user does not request installation, the agent stores the file on the desktop (step 632), and the user may, at a later time, request installation. Otherwise, if installation is requested, the user installs the file by performing the necessary processing so that the file is executable by the user (step 630).

Throughout the downloads routine, the agent saves and updates the status in download status section 764 in downloads screen 750 for the particular file being processed (step 624). Updating the status provides for changing the status in status column 768 for the corresponding file in order to indicate its status, as well as providing an indication of the amount downloaded in completion column 770 and an indication of the date when last downloaded in date column 772.

Figure 8:
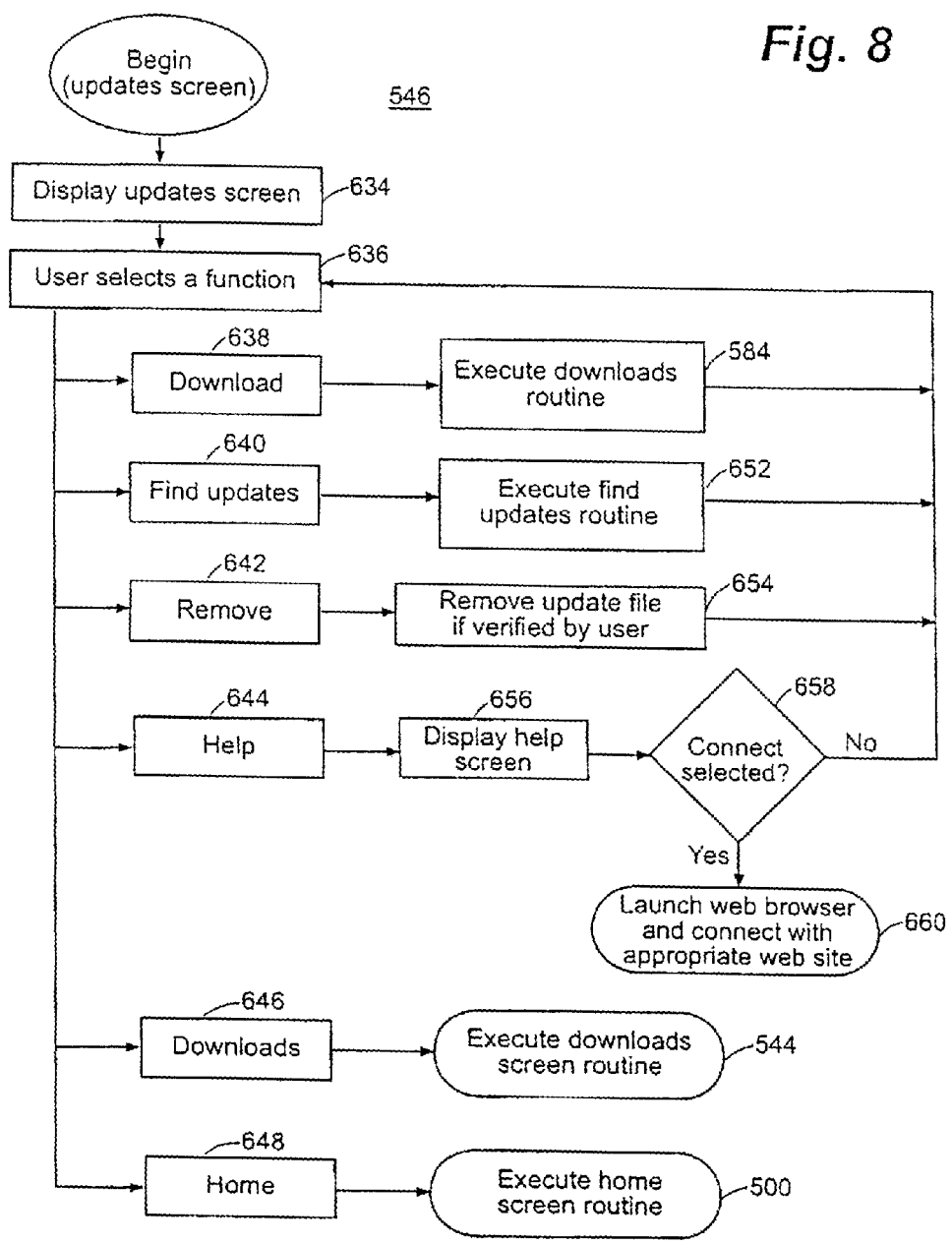
FIG. 8 is a flow chart of an updates screen routine for the agent.

FIG. 8 is a flow chart of updates screen routine 546 executed upon a user's selection of updates section 720 in home screen 700 or downloads screen 750. In routine 546, the agent displays an updates screen 795, shown in FIG. 22, upon a user's selection of updates section 720 (step 634). Within updates screen 795, the user selects a particular function (step 636) and the agent in response executes the requested function. Updates screen 795 includes an update status section 802 providing for information concerning updates to particular files. In particular, a name column 803 provides an identification of a file name and, as shown indented, an indication of updates to the corresponding files. A price column 804 indicates a price for the particular update, and a type column 805 indicates that type of update such as an add-on. A details section 806 provides for information concerning the particular highlighted (selected) update in update status section 802.

In updates screen routine 546, selection of download section 797 (step 638) causes execution of downloads routine 584 (FIG. 7) for the selected update (step 650). A selected update is shown with highlighting, for example, and a user may select an update in the same manner as selecting a section. Selection of a find updates section 799 (step 640) causes execution of a find updates routine as further explained below (step 652). Selection of a remove section 801 (step 642) causes the agent to remove a file or update selected by user, if the user verifies the removal (step 654). Selection of a help section 807 (step 644) causes display of a help screen 808 shown in FIG. 23 (step 656). Help screen 808 provides for display of information to the user concerning finding updates for files. Help screen 808 specifically includes connect section 730 for a user to connect with an appropriate web site in order to obtain more help information. From help screen 808 the agent determines if the user selects connect section 730 (step 658); if so, the agent launches the web browser and connects with the appropriate web site in order to obtain more help information (step 660).

Selection of downloads section 718 in updates screen 795 (step 646) causes the agent to execute downloads screen routine 544 (FIG. 6). Selection of home section 702 (step 648) causes the agent to display home screen 700 and execute home screen routine 500 (FIGS. 5a and 5b).

Figure 9A:
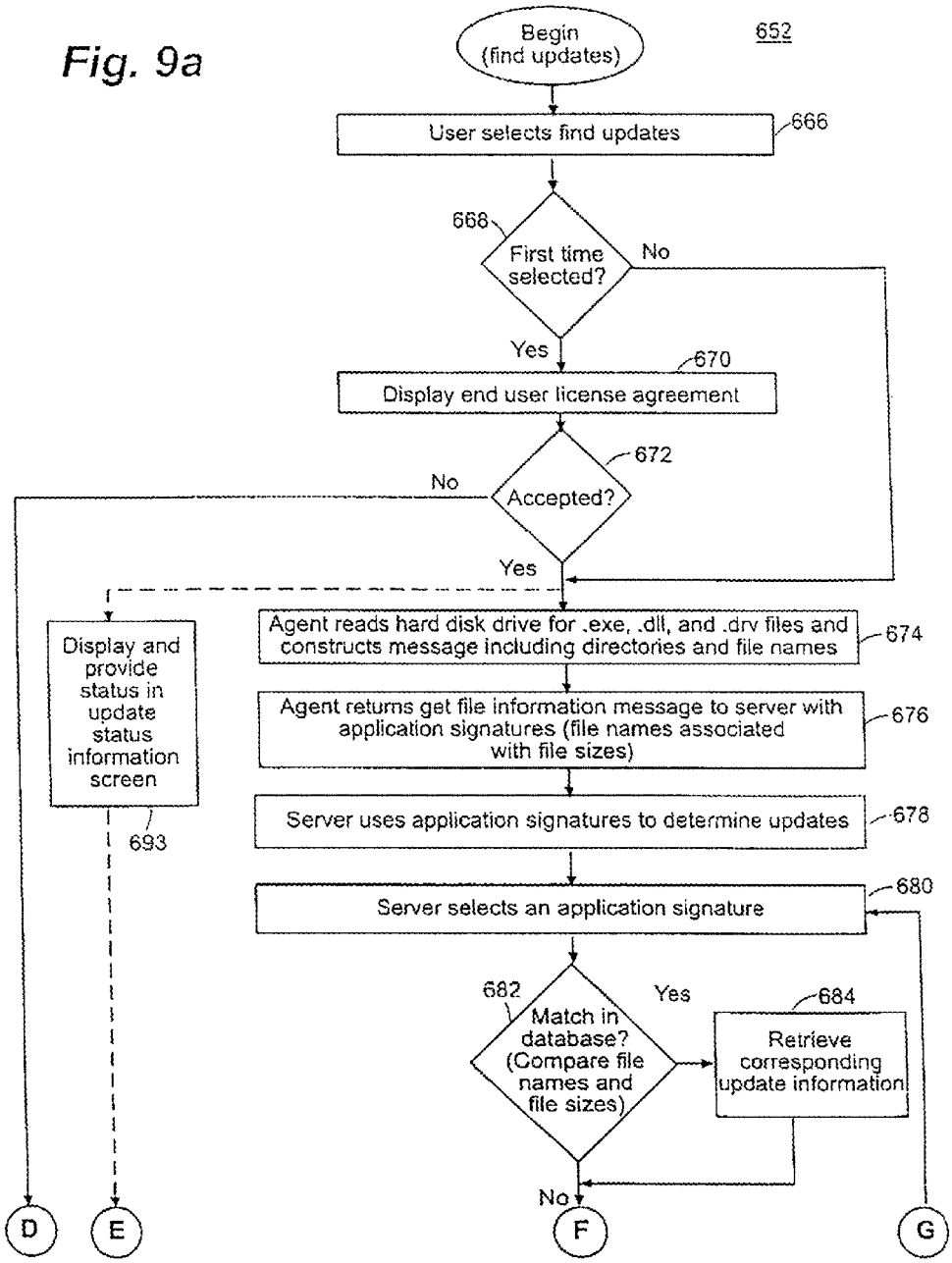
FIGS. 9*a* and 9*b* are a flow chart of find updates routine for the agent to locate and download information concerning update to files.
Figure 9B:
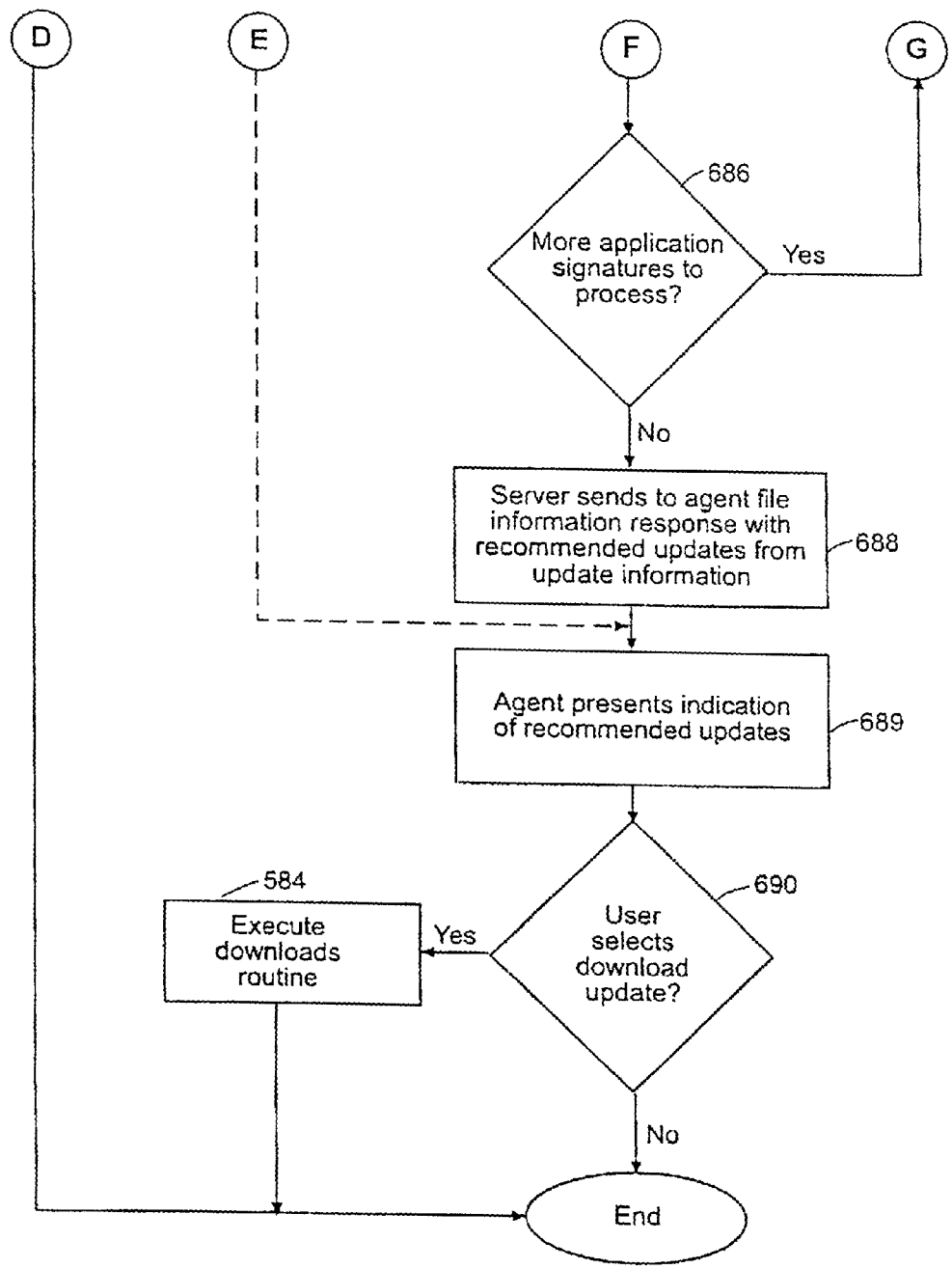
Figure 10:
Figure 11:

FIGS. 9a and 9b are a flow chart of find updates routine 652 executed upon selection of find updates section 799 in updates screen 795 or based upon schedule information. Find updates routine 652 permits the agent through interaction with server 205 to automatically search for updates to particular files. The agent and server use application signatures in order to uniquely identify the files stored on a user system. By uniquely identifying those files, the server may determine whether updates exist for particular files. The use of application signatures is particularly useful when files have many different versions, as often exists for software applications, and the server must determine whether an update exists for a particular version of the file on a user machine. The term "application signature" refers to any information used to uniquely identify a file, an example of which is provided below.

In find updates routine 652, the user selects find update section 799 (step 666). The agent may include an end user license agreement for the user. If it has an end user agreement, the agent determines if this is the first time the user has requested to find updates (step 668); if so, the agent displays an end user license agreement (step 670) and determines if the user accepts the agreement (step 672). The agent may be configured to only look for updates if the user has accepted the end user license agreement. Alternatively, the agent may operate without an end user license agreement or with varying versions of such agreement.

Based upon a user's selection of find updates section 799 or upon schedule information as determined in steps 557 and 558, the agent searches for updates. The agent scans the hard disk drive on the user's machine in order to search for executable (.exe) files, dynamic link library (.dll) files, and driver (.drv) files, and the agent constructs a message including the directories and file names (step 674). Executable files are identified by an ".exe" suffix, dynamic link library files are identified by a ".dll" suffix, and driver files are identified by a ".drv" suffix. The agent may alternatively look for other types of files; however, in the exemplary embodiment it generally searches for the executable, dynamic link library, and driver files. The agent returns a get file information message to server 205 with application signatures (step 676).

In this example, the application signatures include a file name and corresponding size in bytes. Certain windows applications, for example, provide file name and size information, and the agent may obtain the file name and size information from such an application or generate the information itself. For certain files, different versions of the executable file may have the same size and, therefore, the executable file name plus size will not alone uniquely identify a particular version. In that case, the agent and server may also use corresponding dynamic link library file names plus associated sizes to construct the application signatures, and for that signature to match, both the executable file name and size, and dynamic link library file name and size, must match a stored signature. Driver files may be used in the application signature in the same manner, requiring a match between driver file names and sizes in addition to the matches between other types of file names and sizes. Therefore, an application signature in this example may include multiple file names and associated sizes for a particular file. Various types of files associated with a single file may be used to generate a unique application signature, depending upon application signatures already stored in the server database.

Server 205 uses the application signature to determine if updates exist for the corresponding files (step 678). In particular, the server selects an application signature (step 680) and determines if a match exists in an updates database by individually comparing the received file names and associated sizes with stored file names and associated sizes (step 682). If a match exists, the server retrieves the corresponding update information (step 684). Update information includes any type of indication of updates to files. The server may include links to a different database including the update information based upon the application signature. The server then determines if more application signatures exist to be processed (step 686); if so, it returns to step 680 to process additional application signatures. After processing all of the application signatures, the server sends to the agent a file information-response with recommended updates from the retrieved update information (step 688). The server also checks if the update recommendation is on the user's machine; if so, it skips the update.

The agent presents an indication of the recommended updates to the user, for example, as shown in update status section 802 in updates status screen 795 (step 689). The agent determines if the user selects an update to be downloaded (step 690). For example, user may select an update and then select download section 797 in order to download that update. If the user requests to download an update, the agent executes the download routine 584 (FIG. 7) to download the selected update (step 692).

Figure 24:
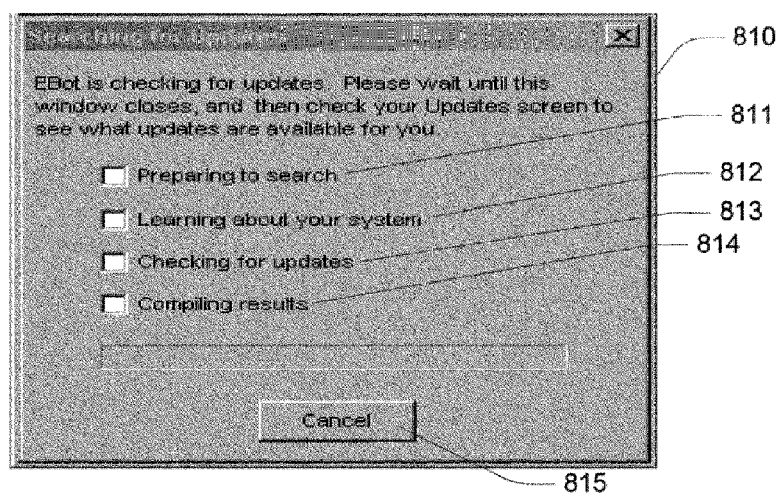

While the agent executes processing to find the updates, it displays update information in an update status screen 810 shown in FIG. 24 (step 693). In particular, update status screen 810 includes a section 811 for the agent to indicate status of preparing to search, a section 812 indicating that it is scanning the user system to obtain particular hardware information and file information, a section 813 to indicate that it is checking for updates with the server, and a section 814 indicating that it has received update information from the server and is compiling the results. In this example, the status of each section is indicated by a check-mark displayed in the corresponding box. A cancel section 815 permits the user to cancel the selected function.

In find updates routine 652, steps 678, 680, 682, 684, 686, and 688 are executed by the server, while the agent executes the other steps.

While the present invention has been described in connection with an exemplary embodiment, it will be understood that many modifications will be readily apparent to those skilled in the art, and this application is intended to cover any adaptations or variations thereof. For example, different labels for the various modules and databases, and various hardware embodiments for the servers and machines, may be used without departing from the scope of the invention. This invention should be limited only by the claims and equivalents thereof.

What is claimed is:

1. A method for scheduling downloading of a file to an end user machine by interacting through a network with a server, comprising steps of:
   receiving from a user an identification of a file to be downloaded at the end user machine;
   receiving from the user, user selected schedule information at the end user machine the user selected schedule information identifying a specific future download date and time to download the file, the specific future download date and time including both an hour and minute within the hour to initiate downloading of the identified file; and
   automatically downloading the identified file from the server to the end user machine through the network based upon the user selected schedule information by the end user machine (i) detecting an occurrence of the specific future download date and time, and (ii) requesting download of the identified file from the server through the network in response to the detected occurrence wherein the automatically downloading step includes:
      transmitting to the server a request to download the file to the end user machine, the request including an identification of the file and an indication of starting point for transmission of the file;
      receiving a serial transmission of digital information, at the end user machine, for the file beginning at the starting point;
      appending the digital information, at the end user machine, to a previously-received portion of the file, if present; and
      storing the received digital information in the end user machine.

2. An end user machine operatively configured to schedule downloading of a file from a server over a network, the end user machine comprising a processor, memory, and a software agent application comprising a set of instructions stored in the memory which when executed by the processor causes the processor to perform operations of a scheduled file download comprising:
   receiving from a user an identification of a file to be downloaded at the end user machine;
   receiving from the user, user selected schedule information at the end user machine, the user selected schedule information identifying a specific future download date and time to download the file, the specific future download date and time including both an hour and minute within the hour to initiate downloading of the identified file; and
   automatically downloading the identified file from the server to the end user machine through the network based upon the user selected schedule information by the end user machine (i) detecting an occurrence of the specific future download date and time, and (ii) requesting download of the identified file from the server through the network in response to the detected occurrence;

wherein the software agent application further comprises a set of instructions stored in the memory which when executed by the processor causes the processor to perform operations of:

transmitting to the server a request to download the file to the end user machine, the request including an identification of the file and an indication of starting point for transmission of the file;

receiving a serial transmission of digital information, at the end user machine, for the file beginning at the starting point;

appending the digital information, at the end user machine, to a previously-received portion of the file, if present; and storing the received digital information in the end user machine.

3. The end user machine of claim 2 further comprising an input device operatively coupled to the processor and memory and wherein the software agent application further comprises a set of instructions stored in the memory which when executed by the processor causes the processor to perform operations of requesting input from the user through the input device such that the specific future download date and time is received by the end user machine.

4. A method for scheduling a search for updates to files on an end user machine by interacting through a network with a server, comprising steps of:

receiving user selected update schedule information at the end user machine from the user, the user selected update schedule information identifying a specific periodic basis to request updates to files, the specific periodic basis including both a specific time of day and a specific day each week or month to periodically request updates to files;

automatically periodically requesting the updates from the server by the end user machine through the network based upon the user selected schedule information by: (i) detecting an occurrence of the specific time of day and the specific day each week or month of the user selected update schedule information (ii) scanning a memory of the end user machine to search for files having a particular file type determined by a file name extension in response to the detected occurrence, (iii) obtaining an application signature for each file found during the scanning operation that has the particular file type extension, (iv) transmitting a message including the obtained application signatures to the server; and receiving at the end user machine from the server through the network a response with recommended updates for each file having one of the application signatures in the message sent to the server that has update information in an update database associated with the server.

5. The method of claim 4 further comprising a step performed by the user of entering the specific periodic basis for the user selected update schedule information through an input device coupled to the end user machine such that the specific periodic basis includes both a specific time of day and a specific day each week or month is received by the end user machine.

6. The method of claim 4 further comprising steps of:
presenting an indication of the recommended updates on a display device of the end user machine for review by the user;
receiving a user selection of an update to be downloaded at the end user machine from the user; and
downloading the selected the update from the server through the network in response to the user selection.

7. An end user machine operatively configured to schedule a search for updates to files on
an end user machine by interacting through a network with a server, the end user machine comprising a processor, memory, and a software agent application comprising a set of instructions stored in the memory which when executed by the processor causes the processor to perform operations of periodically requesting updates comprising:

receiving, from the user, user selected update schedule information at the end user machine, the user selected update schedule information identifying a specific periodic basis to request updates to files, the specific periodic basis including both a specific time of day and a specific day each week or month to periodically request updates to files;

automatically periodically requesting the updates from the server by the end user machine through the network based upon the user selected schedule information by: (i) detecting an occurrence of the specific time of day and the specific day each week or month of the user selected update schedule information (ii) scanning a memory of the end user machine to search for files having a particular file type extension in response to the detected occurrence, (iii) obtaining an application signature for each file found during the scanning operation that has the particular file type extension, (iv) transmitting a message including the obtained application signatures to the server; and receiving at the end user machine from the server through the network a response with recommended updates for each file having one of the application signatures in the message sent to the server that has update information in an update database associated with the server.

8. The end user machine of claim 7 wherein the software agent application further comprises a set of instructions stored in the memory which when executed by the processor causes the processor to perform operations of receiving, through an input device coupled to the end user machine, the specific periodic basis for the user selected update schedule information as entered by the user such that the specific periodic basis
includes both a specific time of day and a specific day each week or month is received by the end user machine.

9. The end user machine of claim 7 wherein the software agent application further comprises a set of instructions stored in the memory which when executed by the processor causes the processor to perform operations of:

presenting an indication of the recommended updates on a display device of the end user machine for review by the user;
receiving a user selection of an update to be downloaded at the end user machine from the user; and
downloading the selected the update from the server through the network in response to the user selection.

* * * * *